US010194407B2

(12) United States Patent
Takano

(10) Patent No.: US 10,194,407 B2
(45) Date of Patent: Jan. 29, 2019

(54) TERMINAL DEVICE AND METHOD

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 67 days.

(21) Appl. No.: 15/305,884

(22) PCT Filed: May 8, 2015

(86) PCT No.: PCT/JP2015/063389
§ 371 (c)(1),
(2) Date: Oct. 21, 2016

(87) PCT Pub. No.: WO2015/182350
PCT Pub. Date: Dec. 3, 2015

(65) Prior Publication Data
US 2017/0055233 A1 Feb. 23, 2017

(30) Foreign Application Priority Data

May 29, 2014 (JP) ................. 2014-111227

(51) Int. Cl.
*H04W 56/00* (2009.01)
*H04W 4/70* (2018.01)
(Continued)

(52) U.S. Cl.
CPC ......... *H04W 56/001* (2013.01); *H04M 11/00* (2013.01); *H04W 4/70* (2018.02);
(Continued)

(58) Field of Classification Search
CPC .................................. H04W 56/001
(Continued)

(56) References Cited

U.S. PATENT DOCUMENTS

2006/0146887 A1* 7/2006 Muguruma ........... H04W 56/00
370/503
2006/0245440 A1 11/2006 Mizukoshi
(Continued)

FOREIGN PATENT DOCUMENTS

JP 2006-311172 A 11/2006
JP 2011-66530 A 3/2011
JP 2011-525759 A 9/2011

OTHER PUBLICATIONS

"3$^{rd}$ Generation Partnership Project; Technical Specification Group Services and System Aspects; Feasibility study for Proximity Services (ProSe) (Release 12)," 3GPP TR 22.803 V12.2.0, Jun. 2013, (45 pages).

(Continued)

*Primary Examiner* — Samina F Choudhry
(74) *Attorney, Agent, or Firm* — Xsensus, LLP

(57) ABSTRACT

[Object] To provide a mechanism that makes it possible to perform synchronization control that is different in accordance with synchronization signals.
[Solution] There is provided a terminal device including: a synchronization processing unit configured to perform synchronization processing on the basis of a synchronization signal for radio communication; and a control unit configured to control a monitoring period of a synchronization state of the synchronization signal in accordance with a transmission path of the synchronization signal that is subjected to the synchronization processing, and to control processing that is different in accordance with a monitoring result of a synchronization state for the monitoring period.

20 Claims, 18 Drawing Sheets

(51) Int. Cl.
*H04M 11/00* (2006.01)
*H04W 92/18* (2009.01)
*H04W 48/12* (2009.01)
*H04W 72/04* (2009.01)
*H04W 76/00* (2018.01)
*H04W 88/04* (2009.01)
*H04W 88/06* (2009.01)
*H04W 8/00* (2009.01)

(52) U.S. Cl.
CPC ....... *H04W 48/12* (2013.01); *H04W 56/0025* (2013.01); *H04W 72/048* (2013.01); *H04W 76/00* (2013.01); *H04W 92/18* (2013.01); *H04W 8/005* (2013.01); *H04W 88/04* (2013.01); *H04W 88/06* (2013.01)

(58) Field of Classification Search
USPC .......................................................... 370/254
See application file for complete search history.

(56) References Cited

U.S. PATENT DOCUMENTS

| | | | | |
|---|---|---|---|---|
| 2009/0190542 A1* | 7/2009 | Akiyama | ............ | H04W 56/002 370/329 |
| 2010/0003986 A1 | 1/2010 | Chen | | |
| 2011/0216658 A1* | 9/2011 | Etkin | .................... | H04W 56/00 370/242 |
| 2013/0010964 A1* | 1/2013 | Fong | ..................... | H04L 5/0053 380/277 |
| 2013/0336307 A1* | 12/2013 | Park | ...................... | H04W 56/00 370/350 |
| 2014/0146931 A1* | 5/2014 | Sagi | ......................... | G06F 1/10 375/362 |

OTHER PUBLICATIONS

"3$^{rd}$ Generation Partnership Project; Technical Specification Group SA; Feasibility Study for Proximity Services (ProSe) (Release 12)," 3GPP TR 22.803 V0.2.0, Feb. 2012, (18 pages).

"D2D synchronization procedure for resource pool configuration," 3GPP TSG RAN WG1 Meeting #77, R1-142119, http://www.3gpp.org/ftp/tsg_ran/WG1_RL1/TSGR1_77/Docs/R1-142119.zip, May 19-23, 2014, (5 pages).

"TDM resource allocation for D2D synchronization," 3GPP TSG RAN WG1 Meeting #77, R1-142118, http://www.3gpp.org/ftp/tsg_ran/WG1_RL1/TSGR1_77/Docs/R1-142118.zip, May 19-23, 2014, (5 pages).

International Search Report dated Aug. 11, 2015 in PCT/JP2015/063389 filed May 8, 2015.

* cited by examiner

FIG. 8

| ATTRIBUTES | SYNCHRONIZATION SIGNALS |
|---|---|
| Attr1 | Sq1 |
| | Sq2 |
| | Sq3 |
| | Sq4 |
| Attr2 | Sq5 |
| | Sq6 |
| | Sq7 |
| | Sq8 |
| Attr3 | Sq9 |
| | Sq10 |
| | Sq11 |
| | Sq12 |
| Attr4 | Sq13 |
| | Sq14 |
| | Sq15 |
| | Sq16 |

TERMINAL DEVICE AND METHOD

TECHNICAL FIELD

The present disclosure relates to a terminal device and a method.

BACKGROUND ART

Different from the typical cellular communication, which allows a base station to send and receive signals to and from a terminal device, device-to-device communication (D2D communication) allows two or more terminal devices to directly send and receive signals to and from each other. D2D communication is thus expected to create a new utility form of terminals which is different from that of the typical cellular communication. Examples of possible application include information sharing through data communication between proximate terminal devices or in a group of proximate terminal devices, information distribution from installed terminal devices, and autonomous communication referred to as machine to machine (M2M) between machines.

D2D communication can also be used to offload data in order to address the considerably increased data traffic by a recent increase in smartphones. For example, there are sharply increased needs to send and receive the streaming data of moving images today. Moving images, however, generally have the large amount of data. Accordingly, moving images problematically consume a large number of resources in a radio access network (RAN). If terminals are appropriate for D2D communication (e.g. the terminals have a small distance between each other), it is thus possible to reduce the resources consumed in an RAN and the processing loads on the RAN by offloading moving image data onto D2D communication. In this way, D2D communication is beneficial for both communication service providers and users. Accordingly, D2D communication is today recognized as one of the important technical fields necessary for Long Term Evolution (LTE), and attracts attention in the 3rd Generation Partnership Project (3GP) standardization meetings.

For example, Non-Patent Literature 1 discloses a use case of D2D communication.

CITATION LIST

Non-Patent Literature

Non-Patent Literature 1: 3GPP TR 22.803 "3rd Generation Partnership Project; Technical Specification Group Services and System Aspects; Feasibility study for Proximity Services (ProSe)"

SUMMARY OF INVENTION

Technical Problem

A terminal synchronizes with another terminal in order to perform D2D communication. For example, terminals that perform D2D communication synchronize with each other by sending and receiving synchronization signals. There can be some types of synchronization signal. It is then desired to provide a mechanism that makes it possible to perform synchronization control that is different in accordance with synchronization signals.

Solution to Problem

According to the present disclosure, there is provided a terminal device including: a synchronization processing unit configured to perform synchronization processing on the basis of a synchronization signal for radio communication; and a control unit configured to control a monitoring period of a synchronization state of the synchronization signal in accordance with a transmission path of the synchronization signal that is subjected to the synchronization processing, and to control processing that is different in accordance with a monitoring result of a synchronization state for the monitoring period.

In addition, according to the present disclosure, there is provided a method including: performing synchronization processing on the basis of a synchronization signal for radio communication; and controlling, by a processor, a monitoring period of a synchronization state of the synchronization signal in accordance with a transmission path of the synchronization signal that is subjected to the synchronization processing, and controlling processing that is different in accordance with a monitoring result of a synchronization state for the monitoring period.

Advantageous Effects of Invention

According to the present disclosure as described above, it is possible to synchronization control that is different in accordance with synchronization signals. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is an explanatory diagram for describing a specific example of a relationship between a synchronization signal and an attribute according to an embodiment.

DESCRIPTION OF EMBODIMENT(S)

Figure 1:
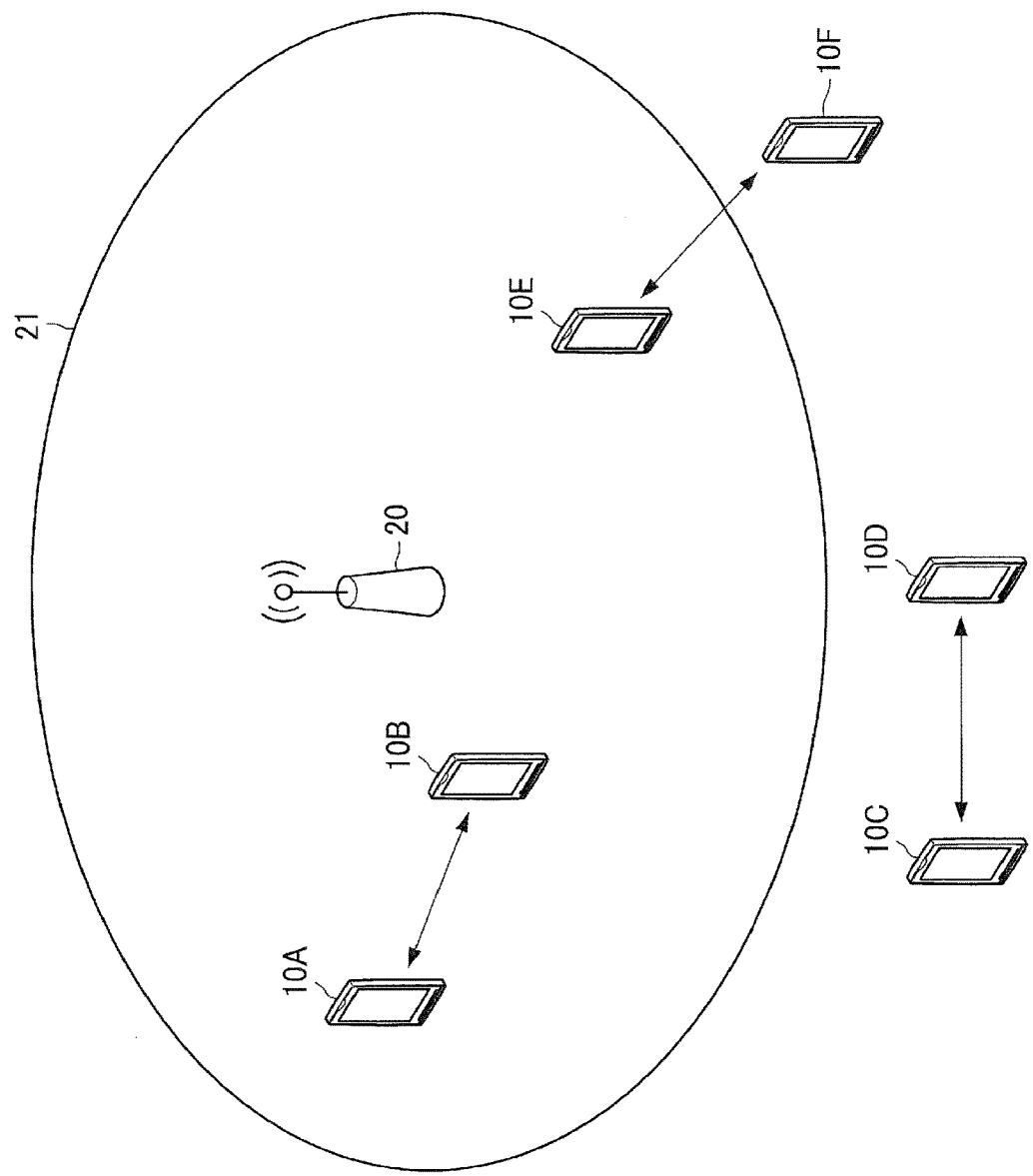
FIG. 1 is a first explanatory diagram for describing a specific example of a use case of D2D communication.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

A description will be now made in the following order.
1. Introduction
2. Schematic configuration of communication system
3. Configuration example of terminal device
4. First Embodiment
4.1. Configuration example of terminal device
4.2. Operation processing example
5. Second Embodiment
5.1. Configuration example of terminal device
5.2. Operation processing example
6. Third Embodiment
6.1. Configuration example of terminal device
6.2. Operation processing example
7. Fourth Embodiment
8. Application examples
9. Conclusion

1. INTRODUCTION

First of all, the technology and reviews of D2D communication will be described with reference to FIG. 1.
(Use Case of D2D Communication)

A use case of D2D communication is discussed in Service and Systems Aspects (SA) 1 or the like of the 3GPP, and described in TR 22.803. TR 22.803 certainly discloses a use case, but does not disclose a specific means for implementing the use case.

Use of D2D Communication

Although a base station and a terminal device perform radio communication with each other, terminal devices never perform radio communication with each other in the typical LTE system. The public safety use or other typical use requires a technique that allows terminal devices to directly perform radio communication with each other.

Examples of the public safety use include a collision preventing alarm and a fire alarm. The public safety use is considered to relate to emergency in most cases, and response speed is of importance in D2D communication.

In contrast, examples of the other typical use include data-offloading. Offloading data in D2D communication makes it possible to decrease loads on the cellular communication network.

Coverage

D2D communication may be performed within the coverage of a base station, or out of the coverage of a base station. Alternatively, if one of the terminal devices is positioned within the coverage of a base station and the other terminal device is positioned out of the coverage of the base station, D2D communication may be performed by these terminal devices, and a specific example of the use case will be described with reference to FIGS. 1 and 2.

FIG. 1 is a first explanatory diagram for describing a specific example of a use case of D2D communication. FIG. 1 illustrates a plurality of terminal devices 10 (i.e. terminal devices 10A to 10F) and a base station 20. As a first example of D2D communication, D2D communication is performed by the terminal devices 10A and 10B positioned within a cell 21 formed by the base station 20 (i.e. coverage of the base station 20). Such D2D communication is referred to as intra-coverage D2D communication. As a second example of D2D communication, D2D communication is performed by the terminal devices 10C and 10D positioned out of the cell 21. Such D2D communication is referred to as extra-coverage D2D communication. As a third example of D2D communication, D2D communication is performed by the terminal device 10E positioned within the cell 21 and the terminal device 10F positioned out of the cell 21. Such D2D communication is referred to as partial coverage D2D communication. The extra-coverage D2D communication and the partial coverage D2D communication are also of importance from the perspective of public safety.

Figure 2:
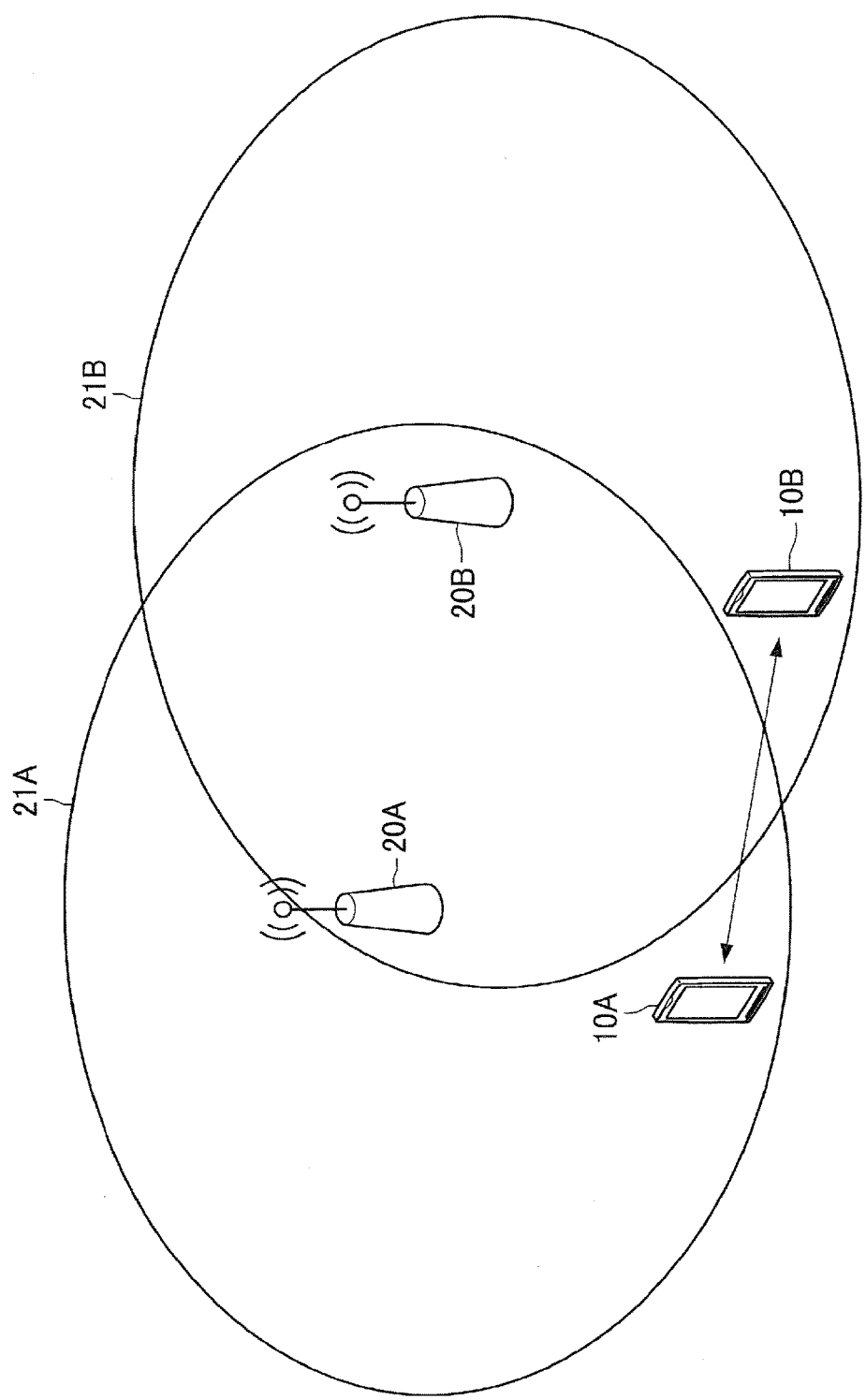
FIG. 2 is a second explanatory diagram for describing a specific example of a use case of D2D communication.

FIG. 2 is a second explanatory diagram for describing a specific example of a use case of D2D communication. FIG. 2 illustrates the terminal devices 10A and 10B, and base stations 20A and 20B. In this example, the base station 20A is operated by a first mobile network operator (MNO), while the base station B is operated by a second MNO. D2D communication is then performed by the terminal device 10A positioned within a cell 21A formed by the base station 20A, and the terminal device 10B positioned within a cell 21B formed by the base station 20B. Such D2D communication is also of importance from the perspective of public safety.

(Flow to D2D Communication)

For example, following synchronization, the discovery of another terminal device, and the establishment of a connection in order, D2D communication is performed. The reviews of the respective steps of synchronization, discovery, and connection establishment will be described.

Synchronization

If two terminal devices are positioned within the coverage of a base station (i.e. cell formed by a base station), the two terminal devices can synchronize with each other to some extent by acquiring synchronization with the base station using downlink signals from the base station.

Meanwhile, if at least one of two terminal devices attempting to perform D2D communication is positioned out of the coverage of a base station (i.e. cell formed by a base station), the at least one of the two terminal devices has to send a synchronization signal for synchronization through D2D communication.

Discovery of Another Terminal Device

Another terminal device is discovered, for example, through the sending and reception of a discovery signal. More specifically, for example, one of two terminal devices sends a discovery signal, and the other of the two terminal devices receives the discovery signal and attempts to communicate with the one of the two terminal devices.

It is desired that a discovery signal be sent at predetermined timing in the time direction. This makes it possible to limit the timing at which the receiving terminal device attempts to receive the discovery signal. As a prerequisite condition, two terminal devices attempting to perform D2D communication acquire synchronization in advance before a discovery signal is received.

Connection Establishment

Two terminal devices attempting to perform D2D communication can establish a connection, for example, as follows. First of all, a first terminal device sends a discovery signal, and a second terminal device receives the discovery signal. Afterwards, the second terminal device sends a request message to the first terminal. The request message requests the establishment of a connection. The first terminal device then sends a completion message to the second terminal device in response to the request message. The completion message indicates that the establishment of a connection is completed. The present processing does not have to be performed in connection less communication.

(Synchronization Signal)

LTE uses a primary synchronization signal (PSS) and a secondary synchronization signal (SSS) as a synchronization signal. A PSS and an SSS are each sent at predetermined timing in the frame structure of a radio frame. A specific example of the timing of a PSS and an SSS in frequency division duplex (FDD) will be described with reference to FIG. 3.

Figure 3:
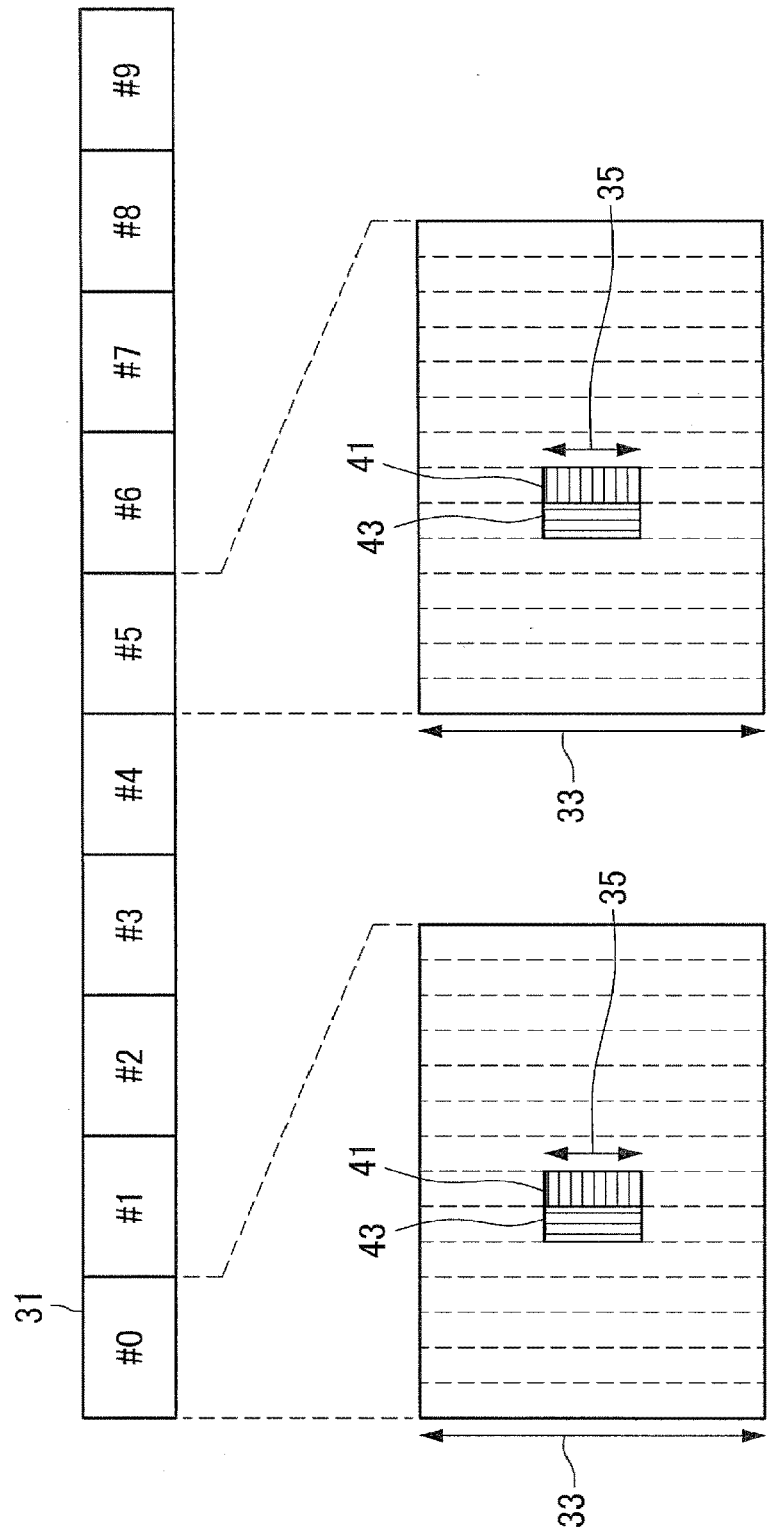
FIG. 3 is an explanatory diagram for describing a specific example of timing of a PSS and an SSS.

FIG. 3 is an explanatory diagram for describing a specific example of timing of a PSS and an SSS. FIG. 3 illustrates ten subframes 31 included in a radio frame. In FDD, PSSs 41 and SSSs 43 are sent in the respective subframes denoted with #0 and #5 (i.e. first and sixth subframes) among the ten subframes 31. More specifically, the SSS 43 is sent in the sixth OFDM symbol of the 14 OFDM symbols included in each of these subframes, while the PSS 41 is sent in the seventh OFDM symbol of the 14 OFDM symbols. Additionally, the PSS 41 and the SSS 43 are each sent by using a predetermined frequency resource 35 (72 subcarriers) positioned in the middle of a frequency band 33.

Although FIG. 3 has described an example of FDD, a PSS and an SSS are each sent at predetermined timing, either, in TDD. Specifically, PSSs are sent in the third OFDM symbols of the respective subframes denoted with #1 (second subframe) and #6 (seventh subframe). SSSs are sent in the fourteenth OFDM symbols of the respective subframes denoted with #0 (first subframe) and #5 (sixth subframe).

A terminal device can learn the timing of each subframe by detecting a PSS. Meanwhile, a terminal device can learn which subframe is denoted with #0, by detecting an SSS.

Furthermore, based on the sequence of a PSS, a terminal device can identify the cell group to which a cell formed by a base station which sends a PSS belongs to from three cell groups. Meanwhile, based on the sequence of an SSS, a terminal device can identify a cell formed by a base station that sends an SSS from 168 cell candidates belonging to a single cell group. In other words, based on the sequences of a PSS and an SSS, a terminal device can identify cells formed by base stations that send a PSS and an SSS from 504 cell candidates.

In D2D communication, a synchronization signal originates from a terminal device, and the terminal device oscillates and sends the synchronization signal in some cases. In this case, the terminal device may use the PSS and the SSS, or may use any of sequences candidates (not limited to 504 sequence candidates) similar to the PSS and the SSS.

(Synchronization Signal in D2D Communication)

Some synchronization signals in D2D communication originate from a base station, and other synchronization signals in D2D communication originate from a terminal device. The synchronization signals originating from a terminal device are used, for example, for the extra-coverage D2D communication. Some of synchronization signals in D2D communication are relayed by a terminal device. In this way, synchronization signals arrive at a terminal device via various types of transmission paths like the synchronization signals originating from a base station or a terminal device, and the synchronization signals relayed by the terminal device from which the synchronization signals originate or a terminal device different from the terminal device from which the synchronization signals originate. The transmission path of a synchronization signal will also be referred to as attribute of a synchronization signal.

Terminal devices acquire synchronization between the terminal devices by using a synchronization signal of any attribute. Here, the attributes of synchronization signals can have priority. It is desired for D2D communication that terminal devices acquire synchronization by using a synchronization signal of high priority.

When a terminal device relays a synchronization signal, the terminal device newly oscillates and sends a synchronization signal at the same frequency and the same timing as those of the received synchronization signal. There can be then an error. For example, a synchronization signal relayed by a terminal device can have the accuracy of the center frequency deteriorate. It is thus desired to acquire synchronization by using a synchronization signal that has a smaller number of relays (hops). A base station frequently includes a more accurate oscillator than a terminal device. It is desired to use a synchronization signal originating from a base station rather than a synchronization signal originating from a terminal device to acquire synchronization. As described above, for example, the following shows the possible priority of attributes from the most accurate and least deteriorated.

(Higher Priority)

Attribute Attr1:
Synchronization signal that originates from a base station, and is sent by the base station from which the synchronization signal originates Attribute Attr2:
Synchronization signal that originates from a base station, and is relayed by a terminal device Attribute Attr3:
Synchronization signal that originates from a terminal device, and is sent by the terminal device from which the synchronization signal originates Attribute Attr4:
Synchronization signal that originates from a terminal device, and is relayed by another terminal device (Lower Priority)

Figure 4:
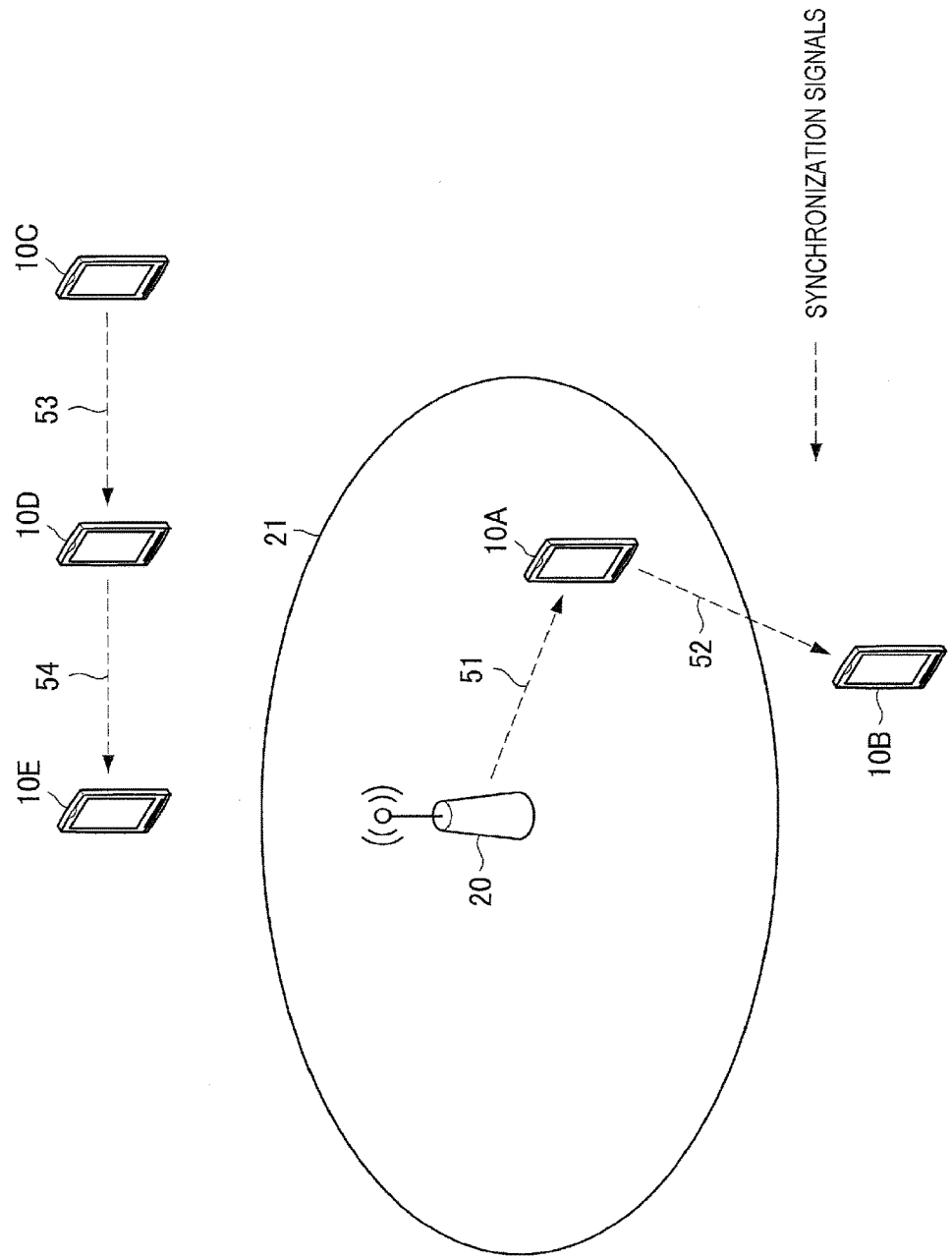
FIG. 4 is an explanatory diagram for describing a specific example of an attribute of a synchronization signal in D2D communication.

FIG. 4 is an explanatory diagram for describing a specific example of an attribute of a synchronization signal in D2D communication. As illustrated in FIG. 4, a synchronization signal 51 sent by the base station 20 has the attribute Attr1. A synchronization signal 52 relayed by the terminal device 10A that has received the synchronization signal 51 originating from the base station 20 has the attribute Attr2. Meanwhile, a synchronization signal 53 originates from the terminal device 10C positioned out of the cell 21 formed by the base station 20 (i.e. coverage of the base station 20), and sent by the terminal device 10C has the attribute Attr3. A synchronization signal 54 relayed by the terminal device 10D that has received the synchronization signal 53 originating from the terminal device 10C has the attribute Attr4.

The above-described priority is an example, and there can be other variation. It is of higher priority in the above that a synchronization signal originates from a base station. However, for example, it may be of higher priority that a synchronization signal is sent (is not relayed) by the device from which the synchronization signal originates, and it may be possible to exchange the priority of the attribute Attr2 and the priority of the attribute Attr3.

(Determination Method of Attribute of Synchronization Signal)

Next, a method for a terminal device to determine the attribute of a synchronization signal with which the terminal device attempts to synchronize will be described. For example, as a first method, the relationship between a synchronization signal and an attribute can be reported to a terminal device by a network in advance. In this case, the terminal device can determine, even before synchronization, what attribute the synchronization signal (sequence) with which the terminal device attempts to synchronize has, and then acquire synchronization. As a second method, a message in which information indicating an attribute is stored can be reported to a terminal device after synchronization is established. For example, the terminal device determines, after establishing synchronization, what attribute the synchronized synchronization signal has, by decoding the message section such as a physical downlink shared channel (PDSCH).

The second method imposes heavy loads on a terminal device because it is difficult to determine the attribute before the terminal device establishes synchronization. It will be thus assumed that a terminal device determines the attribute of a synchronization signal in the first method.

(Processing Performed Out of Sync)

LTE stipulates the processing performed when out-of-sync occurs. The processing performed out of sync in LTE will be described with reference to FIG. 5.

Figure 5:
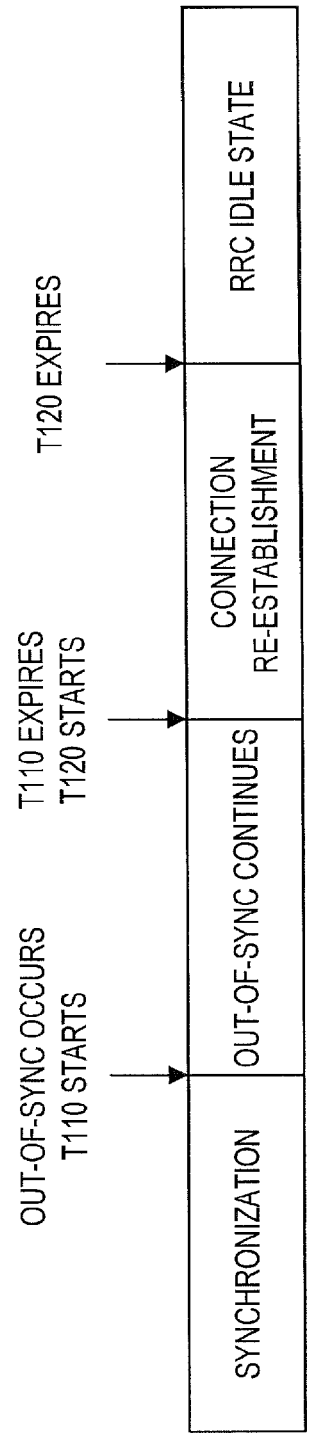
FIG. 5 is an explanatory diagram for describing processing performed out of sync in LTE.

FIG. 5 is an explanatory diagram for describing processing performed out of sync in LTE. Time flows from left to right in FIG. 5. A terminal device measures a simple packet error rate by using a detection error of a physical control format indicator channel (PCFICH) in a physical downlink control channel (PDCCH) during the establishment of synchronization. When the simple packet error rate is, for example, less satisfactory than 0.1, the terminal device determines that a radio link has a problem, in other words, out-of-sync occurs. Once out-of-sync occurs, the terminal device starts a timer T110.

If out-of-sync continues and the situation is not improved from the start of the timer T110 to the expiration of the timer T110, the terminal device starts a timer T120. The terminal device then attempts to re-establish a connection (connection re-establishment) from the start of T311 to the expiration of T311. If the terminal device succeeds in connection re-establishment, the terminal device returns to the state denoted with the reference sign 41 again, and repeats the above-described processing. To the contrary, if the terminal device fails in connection re-establishment, the terminal device transitions from an RRC connection state (RRC Connected) to an RRC idle state (RRC Idle).

In this way, the terminal device does not immediately transition to the RRC idle state, even if out-of-sync occurs. The terminal device observes the synchronization state for some time, and then transitions to the RRC idle state if there is no recovery from the out-of-sync. The method of determining whether or not out-of-sync occurs is not limited to the method based on the packet error rate measured in a PCFICH. For example, if reference signal receive power (RSRP) measured by using a common reference signal sent from a base station (serving eNodeB) or a received signal strength indicator (RSSI) is, for example, −110 dB or less, a terminal device may determine that out-of-sync occurs.

2. SCHEMATIC CONFIGURATION OF COMMUNICATION SYSTEM

Figure 6:
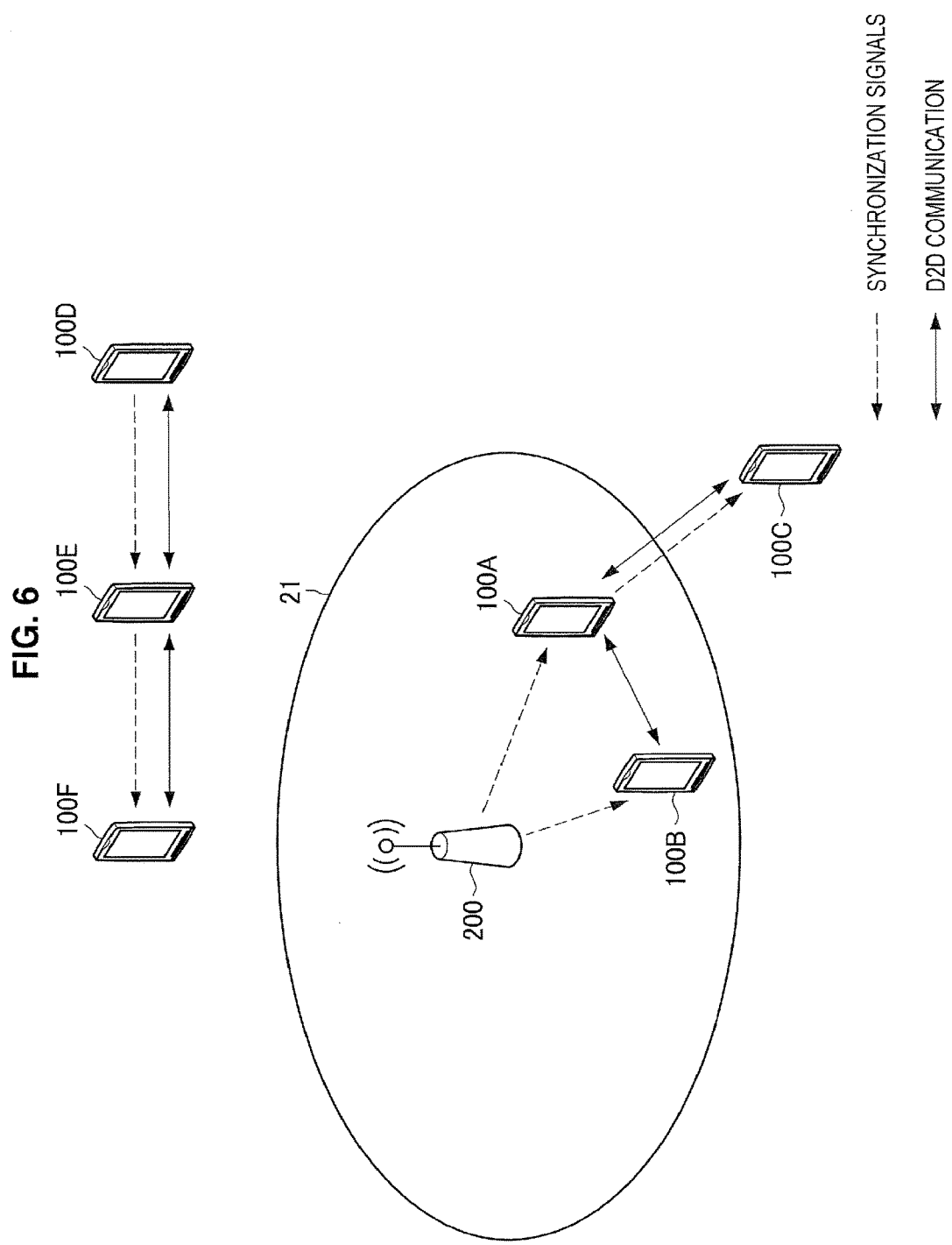
FIG. 6 is an explanatory diagram illustrating an example of a schematic configuration of a communication system according to an embodiment.

Next, the schematic configuration of a communication system 1 according to an embodiment will be described with reference to FIG. 6. FIG. 6 is an explanatory diagram illustrating an example of the schematic configuration of the communication system 1 according to an embodiment of the present disclosure. FIG. 6 illustrates that the communication system 1 includes a plurality of terminal devices 100 (i.e. terminal devices 100A to 100F) and a base station 200. The communication system 1 is compliant with, for example, LTE, LTE-Advanced, or a communication scheme equivalent thereto.

(Terminal Device 100)

The terminal device 100 performs radio communication with the base station 200. For example, if the terminal device 100 is positioned within the cell 21, the terminal device 100 performs radio communication with the base station 200.

(Base Station 200)

The base station 200 performs radio communication with the terminal device 100. For example, the base station 200 performs radio communication with the terminal device 100 positioned within the cell 21.

Especially in an embodiment of the present disclosure, the terminal device 100 performs D2D communication with another terminal device 100. For example, if the terminal device 100 is positioned within the cell 21 (i.e. coverage of the base station 200), the terminal device 100 may perform the intra-coverage D2D communication with another terminal device 100 positioned within the cell 21. Furthermore, if the terminal device 100 positioned within the cell 21, the terminal device 100 may perform the partial coverage D2D communication with another terminal device 100 positioned out of the cell 21. Moreover, if the terminal device 100 is positioned out of the cell 21, the terminal device 100 may perform the extra-coverage D2D communication with another terminal device 100 positioned out of the cell 21 while performing the partial coverage D2D communication with another terminal device 100 positioned within the cell 21.

Here, since the terminal devices 100A and 100B have both established synchronization on the basis of synchronization signals of the attribute Attr1 from the base station 200, the terminal devices 100A and 100B are capable of D2D communication. The terminal device 100A relays a synchronization signal of the attribute Attr1 from the base station 200, and sends a synchronization signal of the attribute Attr2. Once the terminal device 100C establishes synchronization with the terminal device 100A on the basis of the synchronization signal of the attribute Attr2 from the terminal device 100A, the terminal device 100C is capable of D2D communication with the terminal device 100A. The terminal device 100C may further relay the synchronization signal to perform D2D communication with another terminal device. If the synchronization signal of the attribute Attr1 and the synchronization signal of the attribute Attr2 both of which are relayed by the terminal device 100A are synchronized with each other at the frame level, the terminal devices 100B and 100C are capable of D2D communication.

Meanwhile, the terminal device 100D positioned out of the cell 21 sends a synchronization signal of the attribute Attr3 which originates from the terminal device 100D itself. Once the terminal device 100E establishes synchronization with the terminal device 100D on the basis of the synchronization signal of the attribute Attr3 from the terminal device 100D, the terminal device 100E is capable of D2D communication with the terminal device 100D. The terminal device 100E relays a synchronization signal of the attribute Attr3 from the terminal device 100D, and sends a synchronization signal of the attribute Attr4. Once the terminal device 100F establishes synchronization with the terminal device 100E on the basis of the synchronization signal of the attribute Attr4 from the terminal device 100E, the terminal device 100F is capable of D2D communication with the terminal device 100E. Similarly, if the synchronization signal of the attribute Attr1 and the synchronization signal of the attribute Attr3 both of which are relayed by the terminal device 100E are synchronized with each other at the frame level, the terminal devices 100D and 100F are capable of D2D communication.

For example, as a frame format for D2D communication, the frame format for radio communication between the base station 200 and the terminal device 100 is used. For example, radio frames and subframes are used as the units of time in D2D communication. Furthermore, for example, orthogonal frequency division multiplexing (OFDM) is also used in D2D communication, and resource blocks are used as the unit of radio resources. The resource blocks are radio resources over 12 subcarriers in the frequency direction and 7 OFDM symbols in the time direction.

3. CONFIGURATION EXAMPLE OF TERMINAL DEVICE

Next, a configuration example of a terminal device which is common to each embodiment of the present disclosure will be described with reference to FIGS. 7 to 8.

Figure 7:
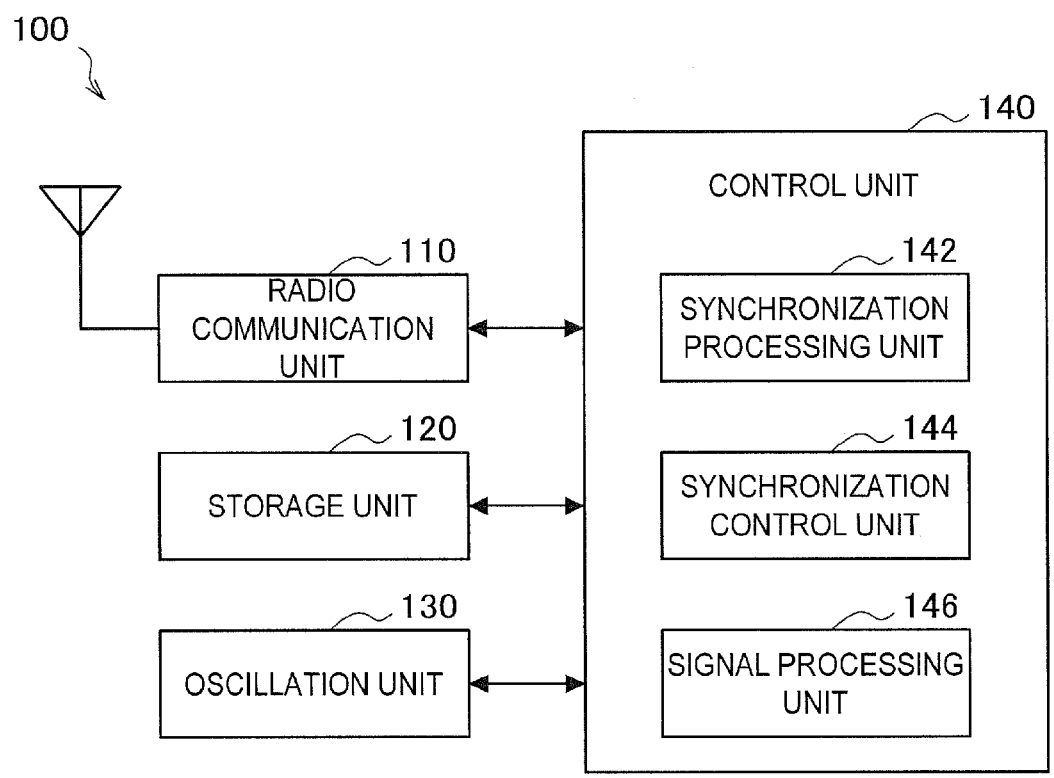
FIG. 7 is a block diagram illustrating a configuration example of a terminal device according to an embodiment.

FIG. 7 is a block diagram illustrating a configuration example of the terminal device 100 according to an embodiment. As illustrated in FIG. 7, the terminal device 100 includes a radio communication unit 110, a storage unit 120, an oscillation unit 130, and a control unit 140.

(1) Radio Communication Unit 110

The radio communication unit 110 is a radio communication interface that mediates the radio communication of the terminal device 100 with another device. In the present embodiment, the radio communication unit 110 performs radio communication with another terminal device 100 or the base station 200. For example, the radio communication unit 110 receives a radio signal sent from the base station 200 or another terminal device 100. The radio communication unit 110 may have the functions of an amplifier, a frequency converter, a demodulator, and the like. The radio communication unit 110 can, for example, output a received synchronization signal to the control unit 140. The radio communication unit 110 also sends a radio signal output from the control unit 140 to the base station 200 or another terminal 100 via an antenna. The radio communication unit 110 may have the functions of a modulator, an amplifier, and the like. The radio communication unit 110 may, for example, modulate a synchronization signal oscillated by the oscillation unit 130 discussed below, amplify the power of the synchronization signal, and send the synchronization signal to another terminal device 100.

(2) Storage Unit 120

The storage unit 120 records and reproduces data for a predetermined recording medium. The storage unit 120 is implemented, for example, as a hard disc drive (HDD). Needless to say, possible variations of the recording medium include a solid-state memory such as a flash memory, a memory card having the solid-state memory built therein, an optical disc, a magneto-optical disk, and a holographic memory. The storage unit 120 is configured to be capable of recording and reproduction in accordance with a recording medium to adopt.

The storage unit 120 stores setting information used by the control unit 140. Examples of the setting information include the relationship between a synchronization signal and an attribute. The network reports the relationship to the terminal device 100 in advance. In the present embodiment, a synchronization signal is a sequence that is different in accordance with the attribute. For example, a synchronization signal may be a sequence that is different in accordance with whether the synchronization signal originates from the base station 200 or the terminal device 100. For example, a synchronization signal may be a sequence that is different in accordance with whether the synchronization signal is sent by the device (the terminal device 100 or the base station 200) from which the synchronization signal originates, or the synchronization signal is relayed by the terminal device 100 different from the device from which the synchronization signal originates. At least one of the timing and frequency of a synchronization signal originating from the terminal device 100 may be different from that of a synchronization signal originating from the base station 200. These kinds of setting information can be included in the system information reported, for example, from the base station 200. A specific example of the relationship between synchronization signals and attributes which is stored in the storage unit 120 will be described with reference to FIG. 8.

FIG. 8 is an explanatory diagram for describing a specific example of the relationship between a synchronization signal and an attribute according to an embodiment. As illustrated in FIG. 8, synchronization signals Sq1 to Sq4 each have the attribute Attr1. Synchronization signals Sq5 to Sq8 each have the attribute Attr2. Synchronization signals Sq9 to Sq12 each have the attribute Attr3. Synchronization signals Sq13 to Sq16 each have the attribute Attr4. The attributes Attr1 to Attr4 illustrated in FIG. 8 correspond to the above-described respective transmission paths of synchronization signals. The base station 200 sends a synchronization signal of the attribute Attr1. Synchronization signals of the respective attributes may be PSSs or SSSs. Synchronization signals of the attribute Attr1 may be a PSS and an SSS, while synchronization signals of the other attributes may be sequences other than a PSS and an SSS.

(3) Oscillation Unit 130

The oscillation unit 130 has a function of oscillating a synchronization signal. For example, the oscillation unit 130 oscillates any of synchronization signals stored in the storage unit 120 on the basis of the control performed by the control unit 140. For example, the oscillation unit 130 oscillates a synchronization signal of the attribute Attr2, Attr3, or Attr4.

(4) Control Unit 140

The control unit 140 functions as an operation processing device and a control device, and controls the overall operation of the terminal device 100 in accordance with a variety of programs. The control unit 140 is implemented by an electronic circuit such as a central processing unit (CPU) and a microprocessor. The control unit 140 may include a read only memory (ROM) that stores a program, an operation parameter and the like to be used, and a random access memory (RAM) that temporarily stores a parameter and the like varying as appropriate. As illustrated in FIG. 7, the control unit 140 functions as a synchronization processing unit 142, a synchronization control unit 144, and a signal processing unit 146.

(4-1) Synchronization Processing Unit 142

The synchronization processing unit 142 has a function of performing synchronization processing on the basis of a synchronization signal for radio communication. For example, the synchronization processing unit 142 obtains a synchronization signal from a radio signal received by the radio communication unit 110, and performs synchronization processing of establishing synchronization on the basis of the supplemented synchronization signal. This synchronization processing includes, for example, frequency synchronization and time synchronization. Obtaining a synchronization signal is also herein referred to as acquiring synchronization. Attempting to obtain a synchronization signal is also referred to as searching for synchronization. Furthermore, stably obtaining a synchronization signal is also referred to as establishing synchronization. The synchronization processing unit 142 can detect out-of-sync, or search for another synchronization signal by continuing monitoring the synchronization state even after the synchronization is once established. As discussed above, the synchronization processing unit 142 can determine out-of-sync, for example, on the basis of the packet error rate measured in a PCFICH, an RSRP, or an RSSI.

(4-2) Synchronization Control Unit 144

The synchronization control unit 144 has the function of a control unit that controls the synchronization processing of the synchronization processing unit 142. For example, the synchronization control unit 144 controls a monitoring period (timer) of the synchronization state with respect to a synchronization signal that is subjected to the synchronization processing performed by the synchronization processing unit 142 in accordance with the attribute (transmission path) of the synchronization signal. For example, the synchronization control unit 144 sets the monitoring period in a manner that synchronization based on a synchronization signal of the attribute having higher priority is preferentially acquired or maintained. The synchronization control unit 144 then controls processing that is different in accordance with a monitoring result of the synchronization state for the monitoring period. For example, the synchronization control unit 144 switches the attribute of a synchronization signal that is subjected to the synchronization processing if the synchronization processing unit 142 fails in acquiring synchronization, while establishing and maintaining synchronization if the synchronization processing unit 142 succeeds in acquiring synchronization. Additionally, the timer may be a count-up timer or a count-down timer.

The synchronization control unit 144 sets the monitoring period on the basis of setting information reported to the terminal device 100 from the network in advance. This setting information is, for example, provided from the base station 200 as system information, and stored in the storage unit 120. In addition, this setting information may be transmitted, for example, through radio resource control (RRC) signaling. As described above, the setting information indicates, for example, the relationship between attributes and synchronization signals, the length of the monitoring period of each attribute, the start timing, and the frequency to use.

The synchronization control unit 144 has a function of controlling the oscillation of a synchronization signal by the oscillation unit 130. Specifically, the synchronization control unit 144 selects a synchronization signal stored in the storage unit 120 in accordance with the attribute of a synchronization signal sent from the terminal device 100, and causes the oscillation unit 130 to oscillate the synchronization signal. The synchronization control unit 144 then controls the radio communication unit 110 to cause the radio communication unit 110 to send the synchronization signal oscillated by the oscillation unit 130 to the outside.

For example, if the establishment of synchronization based on a synchronization signal received by the radio communication unit 110 results in success, the synchronization control unit 144 controls the oscillation unit 130 to cause the oscillation unit 130 to oscillate a synchronization signal based on the attribute of the synchronization signal synchronization of which has been established. For example, if the synchronization signal synchronization of which has been established has the attribute Attr1 or Attr2, the synchronization control unit 144 causes the synchronization signal of Attr2 to oscillate. If the synchronization signal synchronization of which has been established has the attribute Attr3 or Attr4, the synchronization control unit 144 causes the synchronization signal of Attr4 to oscillate. In this way, the terminal device 100 relays a synchronization signal.

For example, if the establishment of synchronization based on a synchronization signal received by the radio communication unit 110 results in failure, the synchronization control unit 144 controls the oscillation unit 130 to cause the oscillation unit 130 to oscillate a synchronization signal originating from the terminal device 100 itself. For example, if the establishment of the synchronization with a synchronization signal of each of all the attributes results in failure, the synchronization control unit 144 causes a synchronization signal of the attribute Attr3 to oscillate.

(4-4) Signal Processing Unit 146

The signal processing unit 146 has a function of performing various kinds of processing for data communication. For example, the signal processing unit 146 establishes synchronization, and then performs D2D communication by sending and receiving data to and from another terminal device 100. The signal processing unit 146 delivers data acquired from a radio signal received by the radio communication unit 110 to the upper layer, generates a radio signal from data delivered from the upper layer, and sends the radio signal to the outside through the communication unit 110.

The configuration example of the terminal device according to the present embodiment has been described so far.

4. FIRST EMBODIMENT

The present embodiment represents a mode for preferentially searching for a synchronization signal of an attribute having higher priority. This allows the terminal device 100 to acquire synchronization on the basis of a synchronization signal of an attribute having higher priority. The terminal device 100 can acquire synchronization on the basis of a more accurate and less deteriorated synchronization signal, and perform D2D communication with another terminal device 100 with no trouble.

[4.1. Configuration Example of Terminal Device]

The characteristic configuration of the terminal device 100 according to the present embodiment will be described.

The synchronization control unit 144 according to the present embodiment sets the length of a search period (monitoring period) for searching for a synchronization signal on the basis of the attribute of the synchronization signal that is searched for. For example, the synchronization control unit 144 sets the greater length of the search period for searching for a synchronization signal as the transmission path of the synchronization signal that is searched for has higher priority. This allows the terminal device 100 to enhance the possibility of acquiring synchronization on the basis of a synchronization signal of an attribute having higher priority.

The synchronization control unit 144 according to the present embodiment sets the start timing of the search period for searching for a synchronization signal on the basis of the attribute of the synchronization signal that is searched for. For example, the synchronization control unit 144 sets the earlier timing of a search for a synchronization signal as the transmission path of the synchronization signal that is searched for has higher priority. This allows the terminal device 100 to enhance the possibility of acquiring synchronization on the basis of a synchronization signal of an attribute having higher priority. The synchronization control unit 144 may search for synchronization signals in units of attributes in series or in parallel. The following describes an example in which synchronization signals are searched for in units of attributes in series with reference to FIG. 9.

Figure 9:
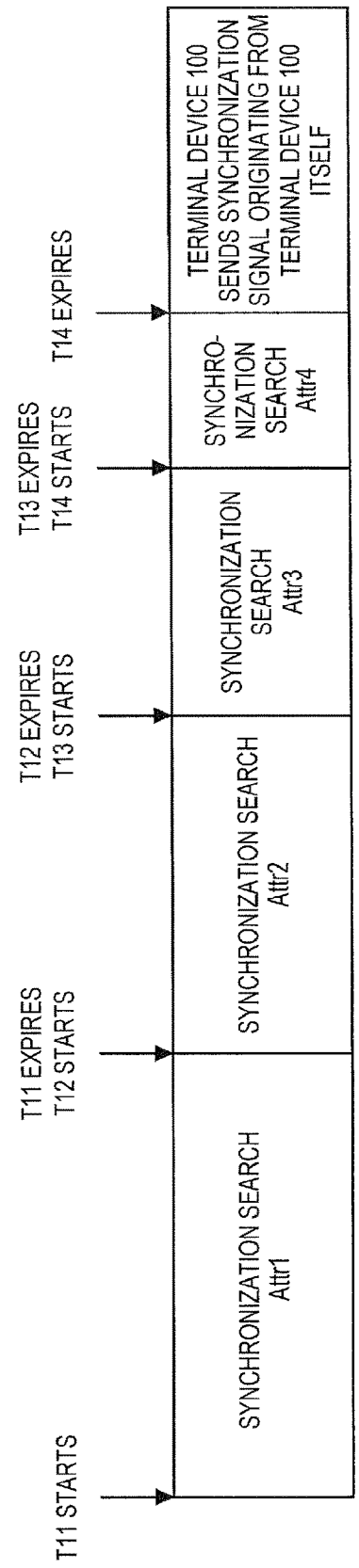
FIG. 9 is an explanatory diagram for describing search processing of a synchronization signal according to a first embodiment.

FIG. 9 is an explanatory diagram for describing the search processing of a synchronization signal according to the present embodiment. As illustrated in FIG. 9, first of all, the synchronization control unit 144 starts a timer T11, and searches for a synchronization signal of the attribute Attr1. If the timer T11 expires with the unsuccessful establishment of synchronization, the synchronization control unit 144 starts a timer T12, and searches for a synchronization signal of the attribute Attr2. If the timer T12 expires with the unsuccessful establishment of synchronization, the synchronization control unit 144 starts a timer T13, and searches for a synchronization signal of the attribute Attr3. If the timer T13 expires with the unsuccessful establishment of synchronization, the synchronization control unit 144 starts a timer T14, and searches for a synchronization signal of the attribute Attr4. As illustrated in FIG. 9, the timers T11 to T14 are longer and have earlier timing as the attributes of synchronization signals that are searched for have higher priority. If synchronization results in success, the synchronization control unit 144 establishes synchronization on the basis of the supplemented synchronization signal. To the contrary, if synchronization based on any attributes results in failure, the terminal device 100 sends a synchronization signal originating from the terminal device 100 itself as illustrated in FIG. 9.

As a comparative example of the search processing of a synchronization signal, such a technique is conceivable that attempts to acquire synchronization on the basis of all the received synchronization signals for a predetermined period, compares the attributes with each other, selects the synchronization signal of high priority, and then establishes synchronization. Such a technique attempts to acquire synchronization on the basis of all the synchronization signals, and thus imposes heavy processing loads on a terminal device.

The synchronization control unit 144 searches for synchronization signals in series in descending order of attributes having higher priority in the search processing illustrated in FIG. 9. Accordingly, a terminal device has less processing loads than in the comparative example. As the attribute of a synchronization signal which is searched for has higher priority, the search period is longer in the search processing illustrated in FIG. 9. Accordingly, this can enhance the possibility that synchronization is acquired on the basis of a synchronization signal of an attribute having higher priority. An example in which synchronization signals are searched for in series in units of attributes has been described so far. Next, an example in which synchronization signals are searched for in parallel in units of attributes will be described.

Figure 10:
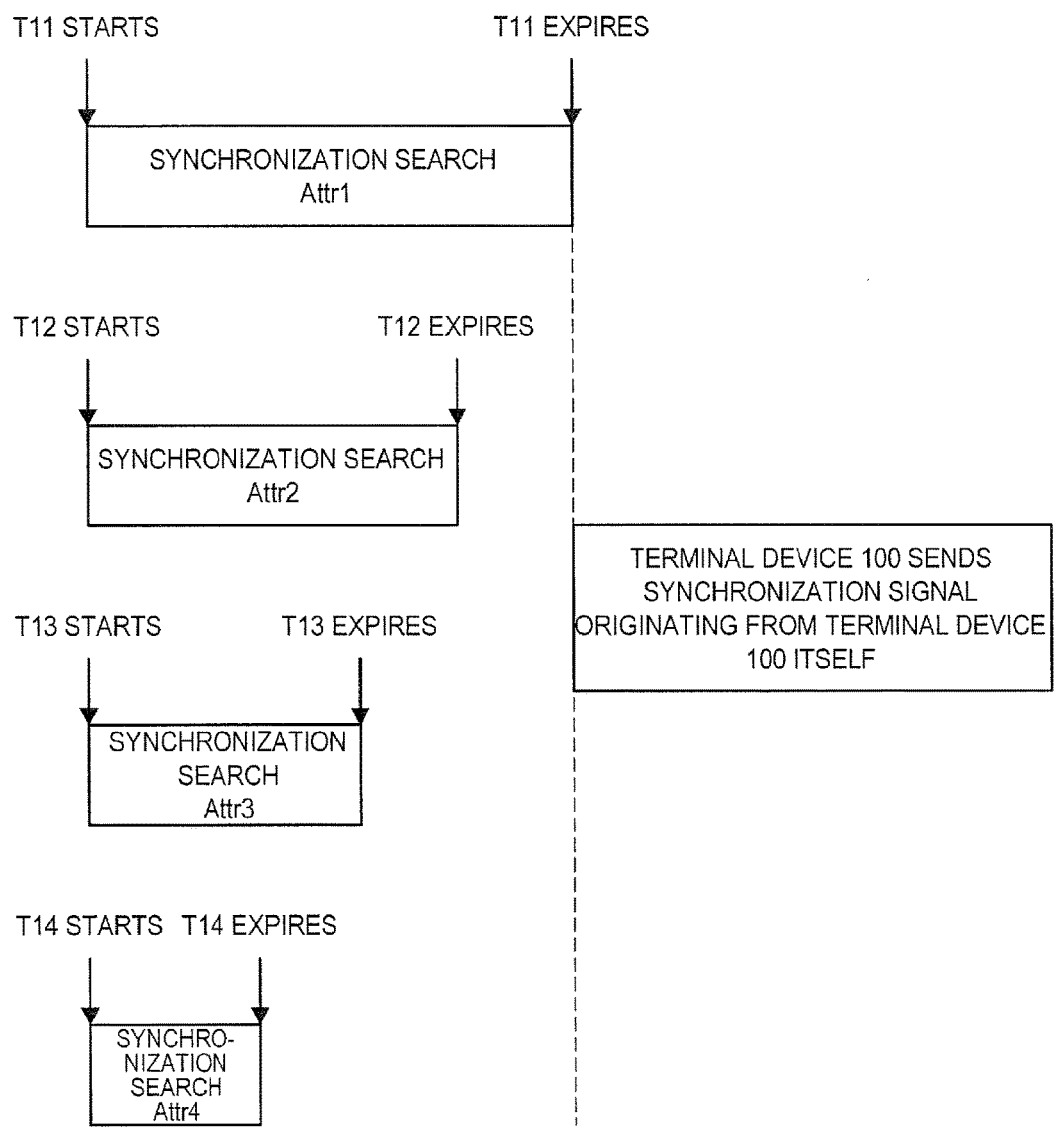
FIG. 10 is an explanatory diagram for describing search processing of a synchronization signal according to a first embodiment.

FIG. 10 is an explanatory diagram for describing the search processing of a synchronization signal according to the present embodiment. As illustrated in FIG. 10, the synchronization control unit 144 starts the timers T11 to T14, and searches for synchronization signals of the attributes Attr1 to Attr4 in parallel. As illustrated in FIG. 10, the timers T11 to T14 are longer as the attributes of synchronization signals that are searched for have higher priority. As another search processing example, the synchronization control unit 144 may, for example, search for synchronization signals of the respective attributes in parallel as in the example illustrated in FIG. 10, have the timer expiration times agree with each other, and delay more the timer start time of an attribute having lower priority.

[4.2. Operation Processing Example]

Figure 11:
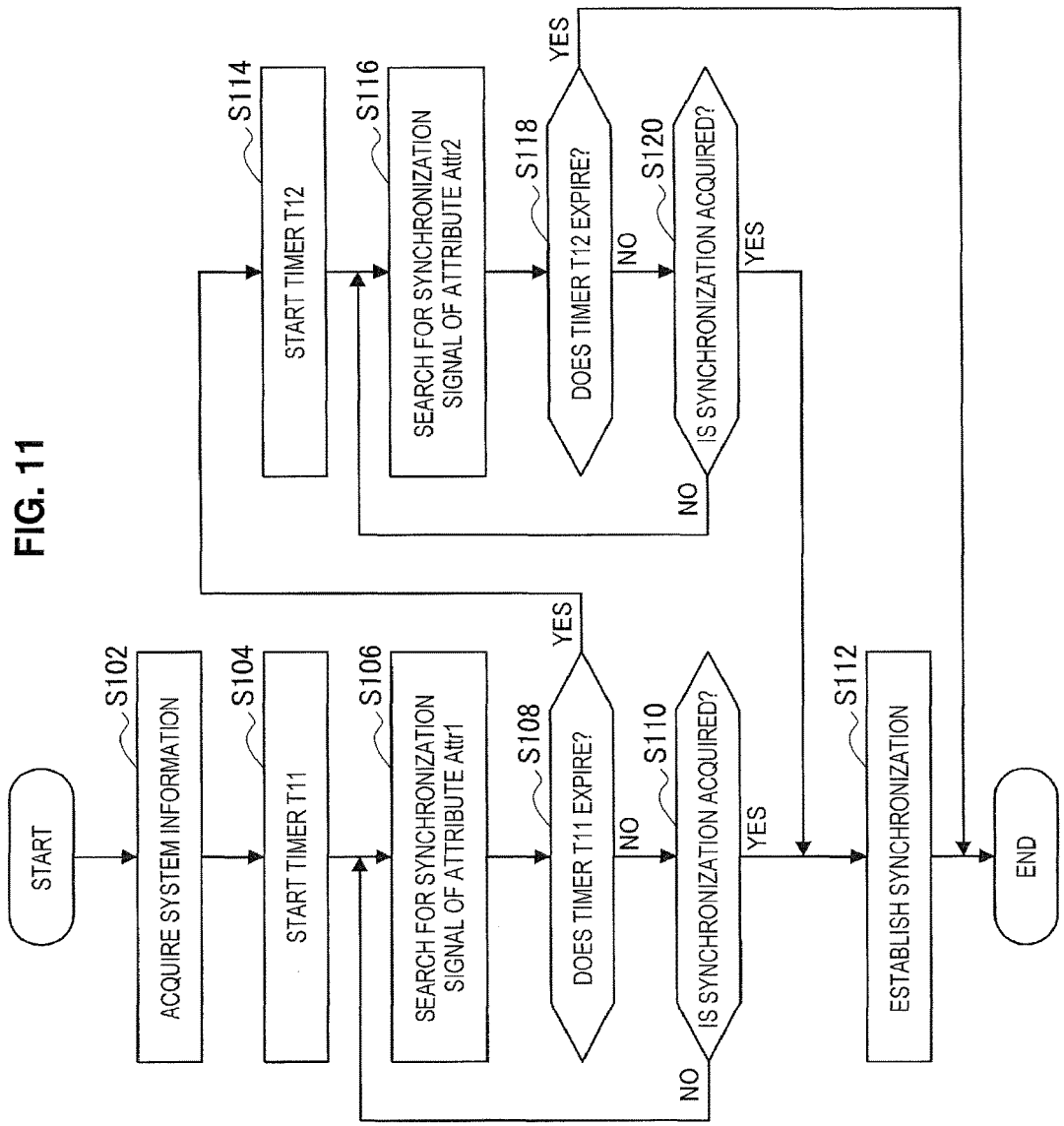
FIG. 11 is a flowchart illustrating search processing of a synchronization signal performed by a terminal device according to the first embodiment.

With reference to FIG. 11, the following describes an operation processing example of the terminal device 100 for performing the search processing of a synchronization signal which has been described above with reference to FIG. 9. The following describes an example of the search processing for the attributes Attr1 and Attr2, but omits an example of the search processing for the attributes Attr3 and Attr4.

FIG. 11 is a flowchart illustrating the search processing of a synchronization signal performed by the terminal device 100 according to the present embodiment. As illustrated in FIG. 11, first of all, in step S102, the terminal device 100 acquires system information. For example, the base station 200 stores the relationship between synchronization signals and attributes, and the search time set for each attribute in the system information, and then sends the system information. The system information is received by the radio communication unit 110, and stored in the storage unit 120.

Next, in step S104, the synchronization control unit 144 starts the timer T11. The synchronization control unit 144 then controls the synchronization processing unit 144 to cause the synchronization processing unit 144 to start to search for a synchronization signal of the attribute Attr1.

This causes the synchronization processing unit 142 to search for a synchronization signal of the attribute Attr1 in step S106. In step S108, the synchronization control unit 144 determines whether or not the timer T11 expires.

If the timer T11 does not expire (S108/NO), the synchronization control unit 144 determines in step S110 whether or not the synchronization processing unit 142 acquires synchronization. If it is determined that the synchronization processing unit 142 acquires synchronization (S110/YES), the synchronization control unit 144 continues supplementing a synchronization signal and establishes synchronization in step S112. To the contrary, if it is not determined that the synchronization processing unit 142 acquires synchronization (S110/NO), the processing returns to step S106 again, and a search for a synchronization signal continues until the timer T11 expires.

If the timer T11 expires (S108/YES), the synchronization control unit 144 starts the timer T11 in step S114. The synchronization control unit 144 then controls the synchronization processing unit 142 to cause the synchronization processing unit 142 to stop searching for a synchronization signal of the attribute Attr1 and to start to search for a synchronization signal of the attribute Attr2.

This causes the synchronization processing unit 142 to search for a synchronization signal of the attribute Attr2 in step S116. In step S1118, the synchronization control unit 144 determines whether or not the timer T12 expires.

If the timer T12 does not expire (S118/NO), the synchronization control unit 144 determines in step S120 whether or not synchronization is acquired. If it is determined that synchronization is acquired (S120/YES), the synchronization control unit 144 continues supplementing a synchronization signal and establishes synchronization in step S112. To the contrary, if it is not determined that synchronization is acquired (S120/NO), the processing returns to step S116 again, and a search for a synchronization signal continues until the timer T12 expires.

If the timer T12 expires (S118/YES), the synchronization control unit 144 assumes that the acquisition of synchronization results in failure, and then terminates the search processing. In the example illustrated in FIG. 9, the search processing for the attributes Attr3 and Attr4 will be similarly performed.

(Supplemental Information)

The above describes that if the terminal device 100 fails in acquiring synchronization within the search period, the terminal device 100 searches for a synchronization signal of another attribute. The present technology is not, however, limited to the example. For example, if no synchronization is established within the search period, the terminal device 100 may search for a synchronization signal of another attribute.

5. SECOND EMBODIMENT

The present embodiment represents a mode for setting, if out-of-sync occurs after synchronization is established, the length of the extension period (monitoring period) to the start of a re-search in accordance with the priority of the attribute of the synchronized synchronization signal.

As described with reference to FIG. 5, the synchronization state is monitored with the single timer T110 in LTE when out-of-sync occurs. If out-of-sync continues and the situation is not improved, a connection is re-established. Accordingly, even if there is a synchronization signal of an attribute having high priority, the terminal device lets go of the synchronization at the same timing as that of a synchronization signal of an attribute having low priority. The present embodiment then uses timers for monitoring when out-of-sync occurs. The timers are different in length according to the priority of the attribute of a synchronization signal that has established synchronization.

[5.1. Configuration Example of Terminal Device]

The characteristic configuration of the terminal device 100 according to the present embodiment will be described.

The synchronization control unit 144 according to the present embodiment sets the length of the extension period from the occurrence of out-of-sync to the start of a search for another synchronization signal, on the basis of the attribute of the synchronization signal out of sync. For example, the synchronization control unit 144 may set the greater length of the extension period as the attribute of the synchronization signal out of sync has higher priority. If the synchronization state is improved within the extension period, the synchronization is maintained. Accordingly, as the attribute of a synchronization signal has higher priority, the terminal device 100 can enhance the possibility of maintaining the synchronization all the more. The synchronization control unit 144 may set the shorter length of the extension period as the attribute of the synchronization signal out of sync has lower priority. If the synchronization state is not improved within the extension period, the search processing for another synchronization signal is started. The terminal device 10 can thus suspend synchronization earlier as the attribute of a synchronization signal has lower priority. In this search processing, the search processing according to the first embodiment may be performed. In this case, the terminal device 100 can suspend synchronization based on an attribute having low priority early, and switch the synchronization to synchronization based on an attribute having high priority.

Information indicating the length of the extension period of each attribute can be included in the system information reported, for example, from the base station 200. In addition, the information may also be transmitted, for example, through RRC signaling. The synchronization control unit 144 sets the extension period by using at least any of information indicating the extension period indicated by the system information and information indicating the extension period transmitted through RRC signaling. The information indicating the length of the extension period of each attribute may be received while the terminal device 100 is positioned within the coverage of the base station 200, and the information may be stored in the storage unit 120. This allows even the terminal device 100 that is out of sync and has difficulty in communication to set an appropriate extension period. In addition, the information indicating the length of the extension period of each attribute may be relayed through D2D communication. This allows even the terminal device 100 having difficulty in directly communicating with the base station 200 out of the coverage to set an appropriate extension period.

Figure 12:
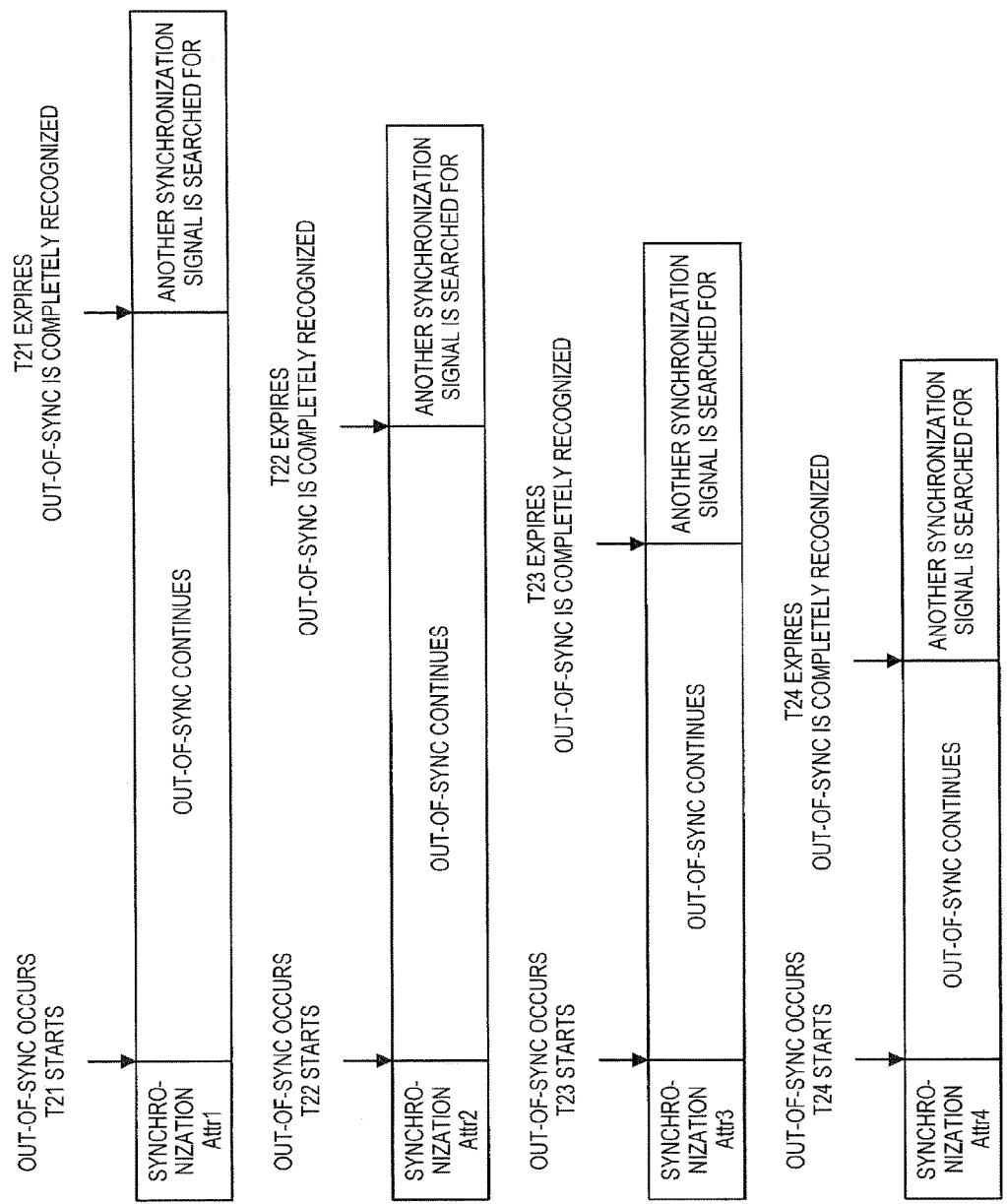
FIG. 12 is an explanatory diagram for describing out-of-sync recognition processing according to a second embodiment.

The following describes a specific example of out-of-sync recognition processing performed by the synchronization control unit 144 according to the present embodiment with reference to FIG. 12.

FIG. 12 is an explanatory diagram for describing the out-of-sync recognition processing according to the present embodiment. As illustrated in FIG. 12, if out-of-sync occurs with synchronization established on the basis of a synchronization signal of the attribute Attr1, the synchronization control unit 144 starts a timer T21 and monitors the synchronization state until the timer T21 expires. If out-of-sync continues, the situation is not improved, and the timer T21 expires, the synchronization control unit 144 completely recognizes out-of-sync, and searches for another synchronization signal. As for the attributes Attr2, Attr3, and Attr4, the synchronization control unit 144 similarly starts timers T22 to T24 and monitors the synchronization state. When the timers expire, the synchronization control unit 144 completely recognizes out-of-sync, and searches for another synchronization signal. In this way, the terminal device 100 sets a longer extension period as the attribute of the synchronization signal out of sync has higher priority. The terminal device 100 hereby can maintain the synchronization if the priority is high, while the terminal device 100 can suspend and switch the synchronization early to synchronization based on an attribute having high priority if the priority is low.

[5.2. Operation Processing Example]

Figure 13:
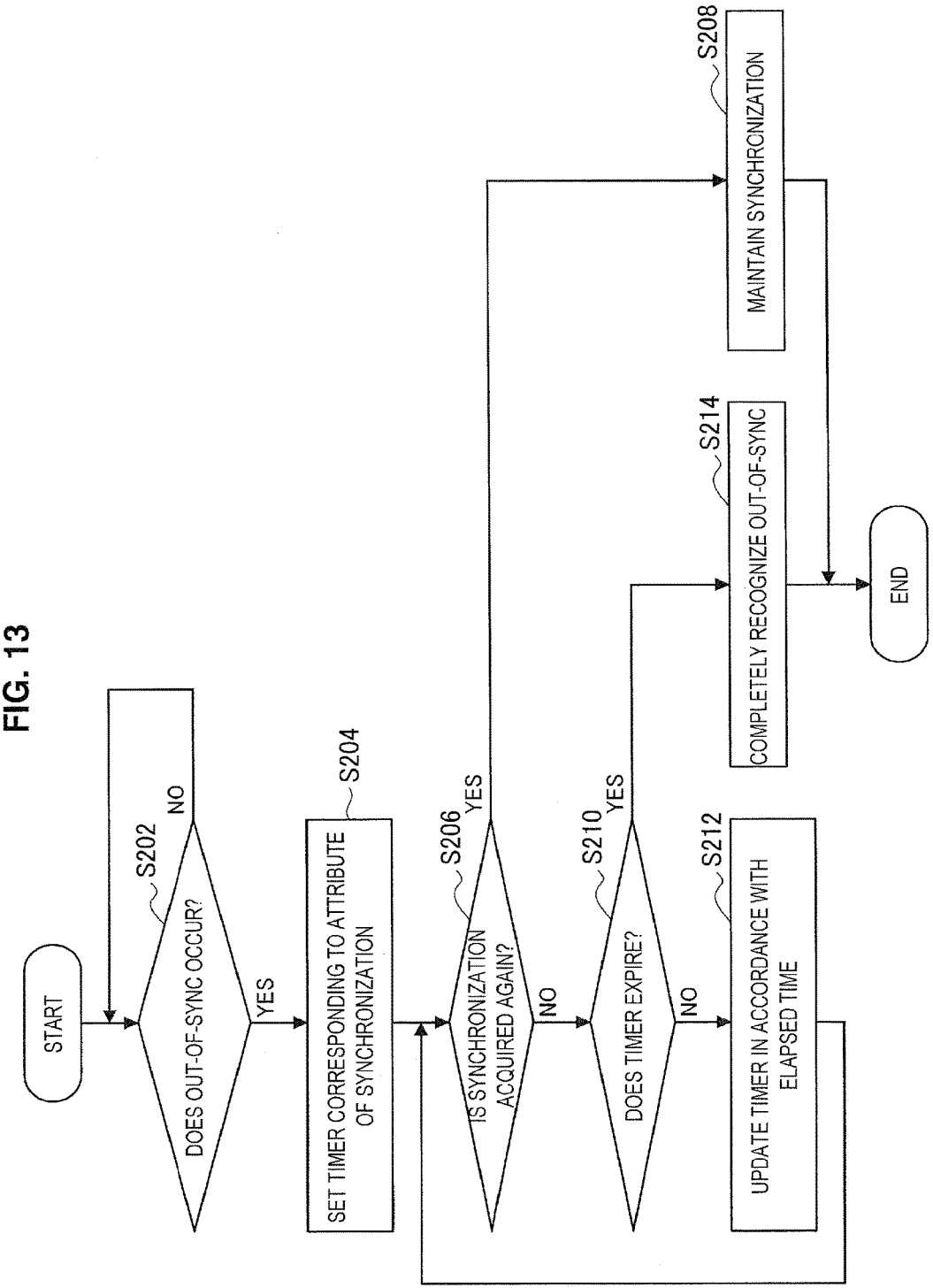
FIG. 13 is a flowchart illustrating out-of-sync recognition processing performed by a terminal device according to the second embodiment.

With reference to FIG. 13, the following describes an operation processing example of the terminal device 100 for performing the out-of-sync recognition processing which has been described above with reference to FIG. 12.

FIG. 13 is a flowchart illustrating the out-of-sync recognition processing performed by a terminal device according to the second embodiment. As illustrated in FIG. 13, first of all, in step S202, the synchronization control unit 144 refers to a monitoring result of the synchronization state from the synchronization processing unit 142, and determines whether or not out-of-sync occurs.

If it is not determined that out-of-sync occurs (S202/NO), the processing returns to step S202 again, and the synchronization processing unit 142 continues monitoring the synchronization state.

If it is determined that out-of-sync occurs (S202/YES), the synchronization control unit 144 sets the timer corresponding to the attribute of synchronization in step S204. For example, the synchronization control unit 144 sets a longer timer as the attribute of the synchronization signal out of sync has higher priority. This causes the synchronization processing unit 142 to search for the synchronization signal out of sync again.

Next, in step S206 the synchronization control unit 144 determines whether or not the synchronization processing unit 142 acquires synchronization again.

If it is determined that the synchronization processing unit 142 acquires synchronization again (S206/YES), the synchronization control unit 144 controls the synchronization processing unit 142 in step S208 to cause the synchronization processing unit 142 to maintain the synchronization.

If it is not determined that the synchronization processing unit 142 acquires synchronization (S206/NO), the synchronization control unit 144 determines in step S210 whether or not the timer expires.

If it is not determined that the timer expires (S210/NO), the synchronization control unit 144 updates the timer in accordance with the elapsed time in step S212. Afterwards, the processing returns to step S206 again.

If it is determined that the timer expires (S210/YES), the synchronization control unit 144 completely recognizes out-of-sync in step S214. Afterwards, the synchronization control unit 144 controls the synchronization processing unit 142 to cause the synchronization processing unit 142 to search for another synchronization signal.

6. THIRD EMBODIMENT

The present embodiment represents a mode for setting the length of the determination period (monitoring period) to the determination of synchronization establishment in accordance with the priority of the attribute of a synchronization signal that has acquired synchronization.

[6.1. Configuration Example of Terminal Device]

The characteristic configuration of the terminal device 100 according to the present embodiment will be described.

The synchronization control unit 144 according to the present embodiment sets the length of the determination period for determining the establishment of synchronization, and determines that synchronization is established if the acquisition of synchronization continuously results in success for the determination period. This can enhance the safety of the processing after synchronization establishment. For example, the synchronization control unit 144 may be triggered by the establishment of synchronization to relay a synchronization signal. The terminal device 100 can avoid the relay of a synchronization signal during unstable synchronization, but relay a synchronization signal only while stably acquiring synchronization. Accordingly, the disagreement about frequency and timing is avoided between the received synchronization signal and a synchronization signal to send. The relay of a synchronization signal is important especially for the terminal device 100 out of the coverage to achieve D2D communication. It is desired that a synchronization signal to relay be sufficiently stable. The synchronization control unit 144 can satisfy this by appropriately setting the determination period for determining the establishment of synchronization. In addition, the signal processing unit 146 may be triggered by the establishment of synchronization to send and receive data. In this case, the terminal device 100 can send and receive data more stably. In addition, the terminal device 100 may be triggered by the establishment of synchronization to send and receive a discovery signal.

LTE does not have the determination period for determining the establishment of synchronization after the synchronization is acquired, in particular. For example, it is assumed that synchronization is established when a terminal device succeeds in acquiring system information or communicating with a base station. In D2D communication, a terminal device is, however, only synchronized, but performs no communication in some cases. In D2D communication, a terminal device synchronizes with any synchronization signal, and then relays and provides the synchronization signal to another terminal device in some cases. The stableness can be different in accordance with the attributes of synchronization signals. Accordingly, it is desired to relay a synchronization signal after confirming that synchronization is established.

The synchronization control unit 144 according to the present embodiment then sets the length of the determination period for determining the establishment of synchronization on the basis of the attribute of a synchronization signal that has succeeded in acquiring synchronization. For example, the synchronization control unit 144 may set a shorter determination period as the attribute of a synchronization signal that has acquired synchronization has higher priority, while the synchronization control unit 144 may set a longer determination period as the priority is lower. Synchronization signals originating from the base station 200 are supposed to be stable. Accordingly, the synchronization control unit 144 sets a shorter determination period, and can hereby make various kinds of processing after synchronization establishment executed earlier. In contrast, synchronization signals originating from the terminal device 100 are supposed to be unstable, and to have a narrow range to reach. Accordingly, the synchronization control unit 144 sets a longer determination period, and can hereby enhance the safety of various kinds of processing after synchronization establishment. For example, it is possible to avoid the relay of a synchronization signal out of sync. The following describes a specific example of the determination processing performed by the synchronization control unit 144 according to the present embodiment with reference to FIG. 14.

Figure 14:
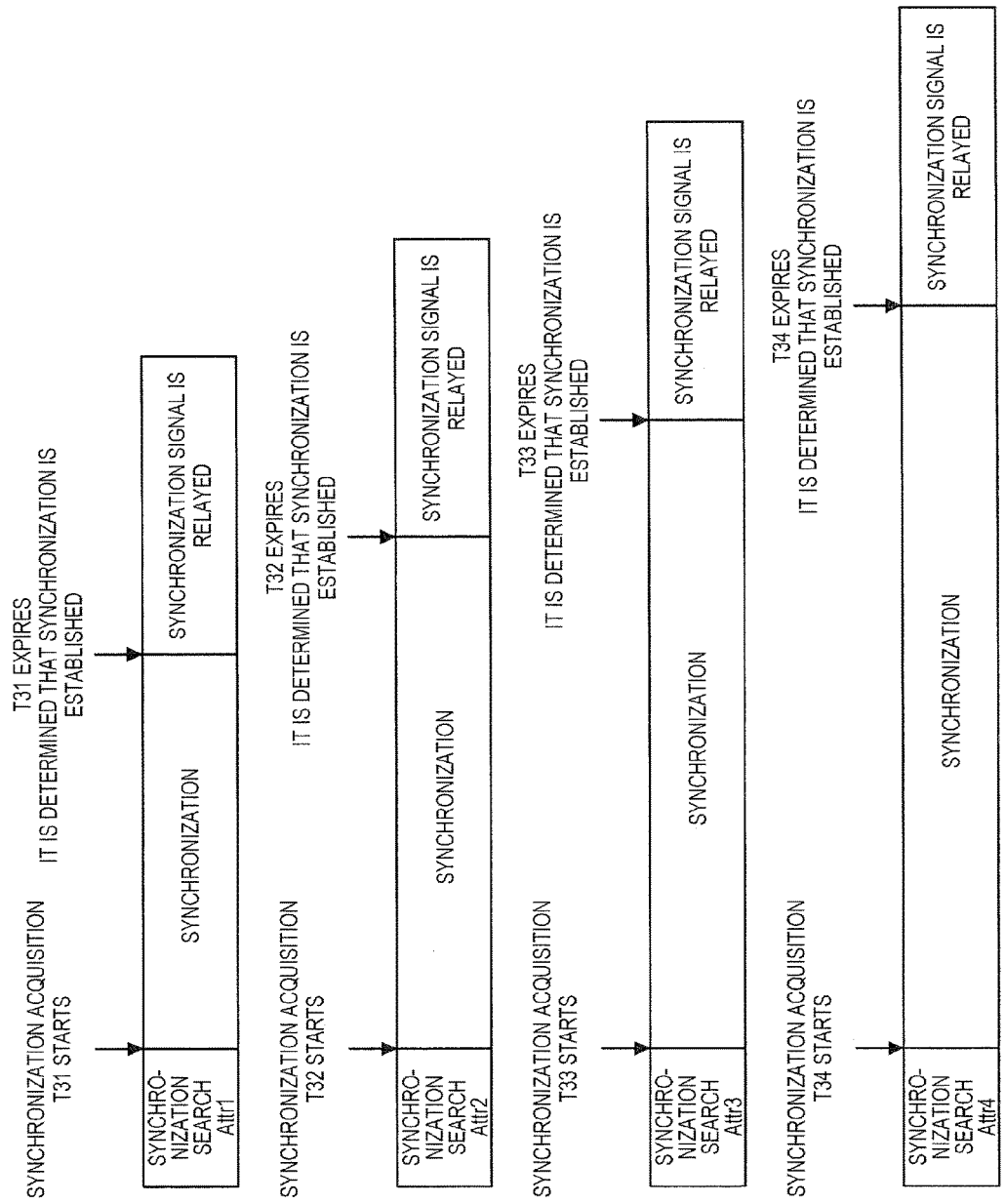
FIG. 14 is an explanatory diagram for describing determination processing of synchronization establishment according to a third embodiment.

FIG. 14 is an explanatory diagram for describing the determination processing of synchronization establishment according to the present embodiment. As illustrated in FIG. 14, when the synchronization control unit 144 searches for a synchronization signal of the attribute Attr1 and acquires synchronization, the synchronization control unit 144 starts a timer T31 and monitors the synchronization state until the timer T31 expires. If synchronization is stably acquired until the timer T31 expires, the synchronization control unit 144 determines that synchronization is established. As for the attributes Attr2, Attr3, and Attr4, the synchronization control unit 144 similarly starts timers T32 to T34 when synchronization is acquired. If synchronization is stably acquired until the timers expire, the synchronization control unit 144 acknowledges that synchronization is established. In this way, setting timers different in length in accordance with the attributes of synchronization signals, and setting shorter timers as the priority is higher make it possible to appropriately determine the establishment of synchronization.

(Supplemental Information)

The determination period according to the present embodiment may be included in the search period described in the first embodiment. For example, when a synchronization signal of the attribute Attr1 is searched for, the acquisition of synchronization triggers the start of the timer T31 between the start of the timer T11 and the expiration of the timer T11. Even if out-of-sync occurs before T31 expires, the re-acquisition of synchronization can trigger the start of the timer T31 before T11 expires. When the terminal device 100 searches for a synchronization signal of another attribute without the establishment of synchronization within the search period, and the search period expires within the determination period after synchronization is acquired, the search period may be extended to the expiration of that determination period or the establishment of synchronization.

[6.2. Operation Processing Example]

Figure 15:
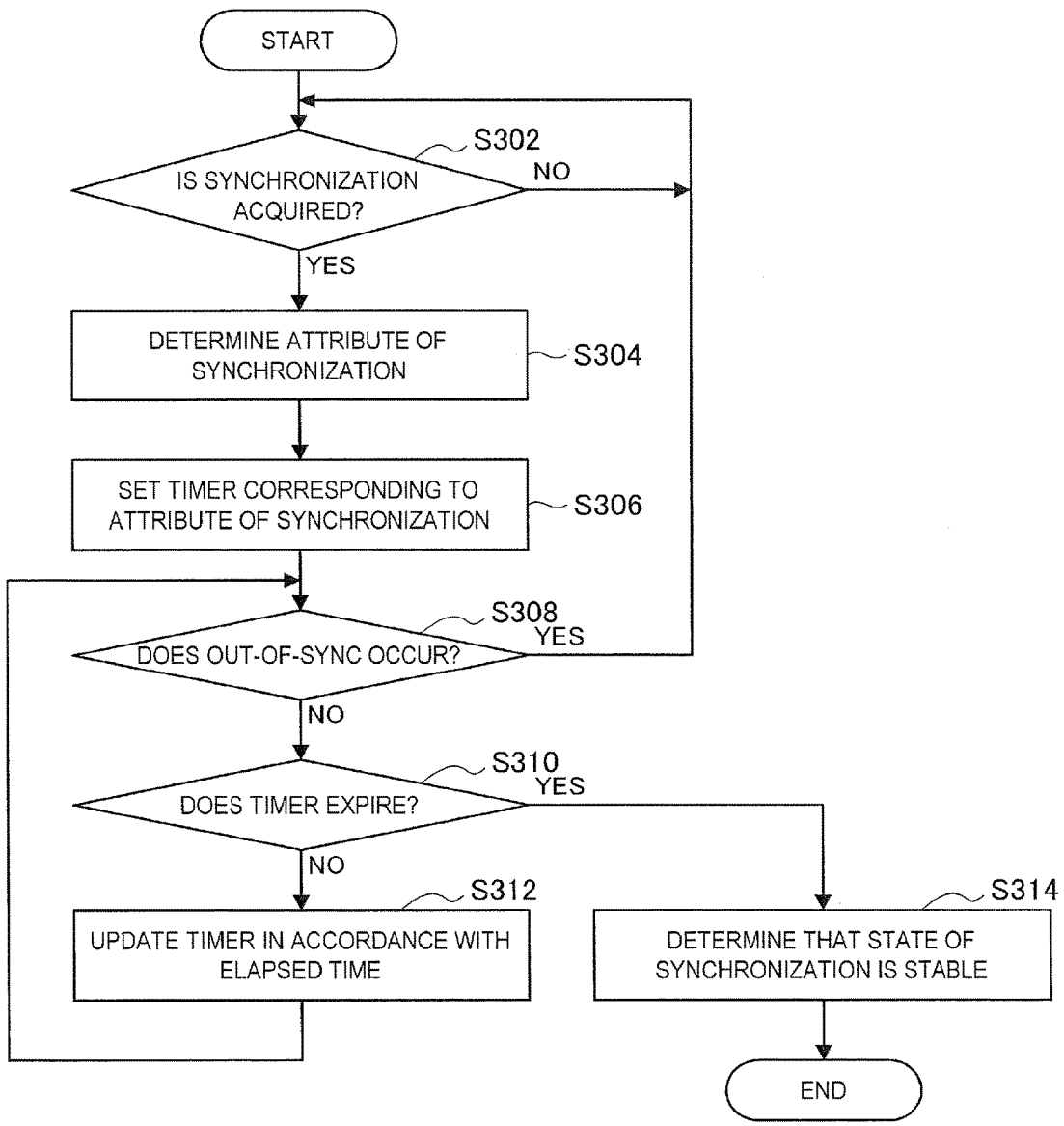
FIG. 15 is a flowchart illustrating determination processing of synchronization establishment performed by a terminal device according to the third embodiment.

With reference to FIG. 15, the following describes an operation processing example of the terminal device 100 for performing the determination processing of synchronization establishment which has been described above with reference to FIG. 14.

FIG. 15 is a flowchart illustrating the determination processing of synchronization establishment performed by the terminal device 100 according to the present embodiment. As illustrated in FIG. 15, first of all, in step S302, the synchronization control unit 144 determines whether or not the synchronization processing unit 142 succeeds in acquiring synchronization.

In step S304, the synchronization control unit 144 then refers to the storage unit 120 to determine the attribute of the synchronization signal synchronization of which has been acquired by the synchronization processing unit 142.

Next, in step S306, the synchronization control unit 144 sets the timer corresponding to the attribute of synchronization. For example, the synchronization control unit 144 sets a shorter timer, as the determination period, as the attribute of the synchronization signal that has acquired synchronization has higher priority, while the synchronization control unit 144 sets a longer timer as the priority is lower.

In step S308, the synchronization control unit 144 then monitors the synchronization processing performed by the synchronization processing unit 142 to determine whether or not out-of-sync occurs.

If it is determined out-of-sync occurs (S308/YES), the processing returns to step S302 again. In this case, the synchronization control unit 144 resets the timer, and starts the timer from scratch if synchronization is acquired again.

If it is not determined that out-of-sync occurs (S308/NO), the synchronization control unit 144 determines in step S310 whether or not the timer expires.

If it is not determined that the timer expires (S310/NO), the synchronization control unit 144 updates the timer in accordance with the elapsed time in step S312. Afterwards, the processing returns to step S308 again.

If it is determined that the timer expires (S310/YES), the synchronization control unit 144 determines in step S314 that the state of synchronization is stable. This causes the synchronization control unit 144 to determine that synchronization is established.

7. FOURTH EMBODIMENT

The present embodiment represents a mode for setting the length of the maintaining period (monitoring period) for maintaining the current synchronization until the start of a search for a synchronization signal of an attribute having higher priority after synchronization is established. The following describes the characteristic configuration of the terminal device 100 according to the present embodiment with reference to FIG. 16.

Figure 16:
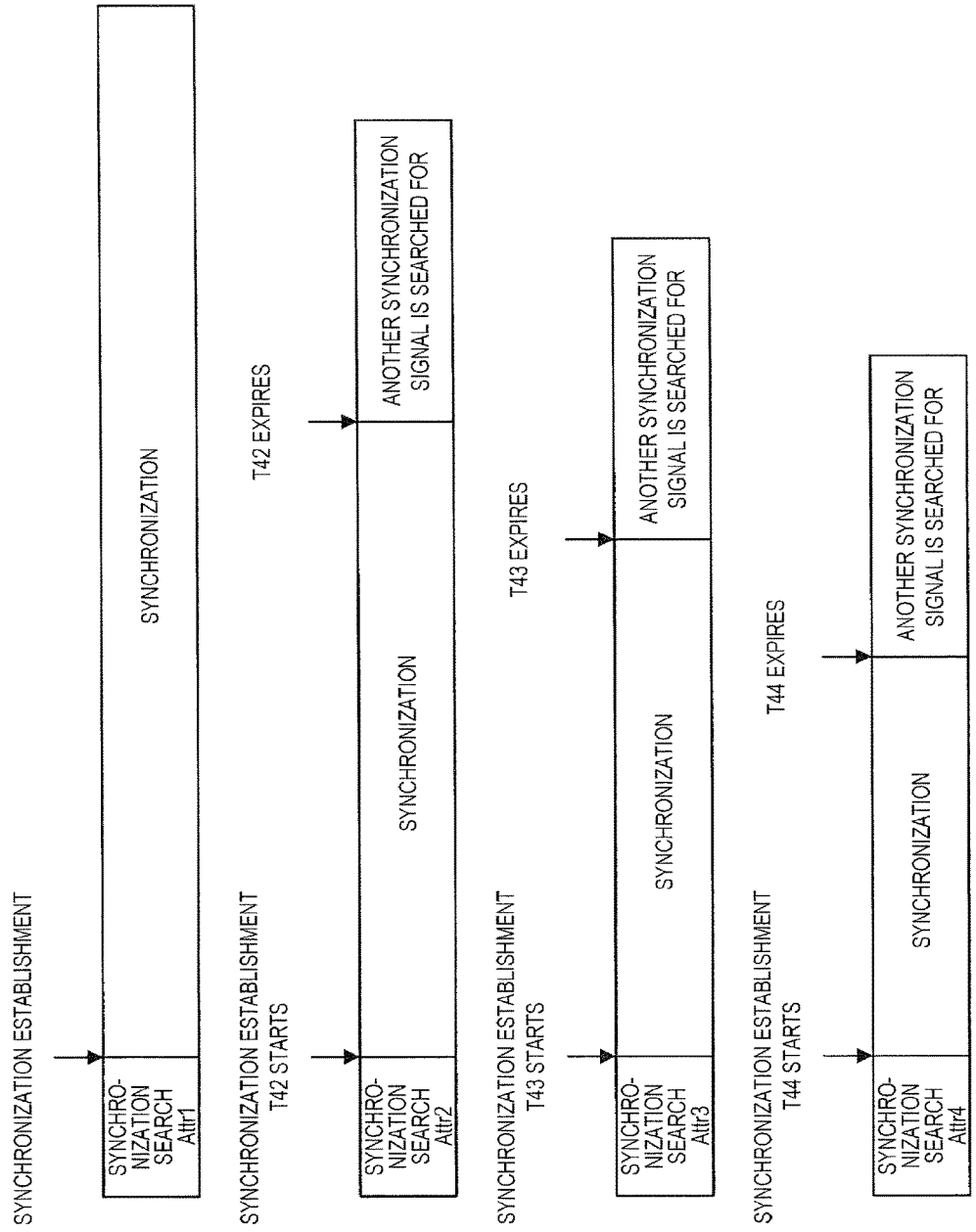
FIG. 16 is an explanatory diagram for describing setting processing of a maintaining period of established synchronization according to a fourth embodiment.

FIG. 16 is an explanatory diagram for describing the setting processing of a maintaining period of established synchronization according to the present embodiment. As illustrated in FIG. 16, if synchronization is established on the basis of a synchronization signal of the attribute Attr1 having the highest priority, the synchronization control unit 144 maintains the synchronization as established. Meanwhile, if synchronization is established on the basis of synchronization signals of the attributes Attr2 to Attr4, the synchronization control unit 144 re-searches for a synchronization signal of an attribute having higher priority after the maintaining time elapses. For example, if synchronization is established on the basis of a synchronization signal of the attribute Attr2, the synchronization control unit 144 starts a timer T42 and controls the synchronization processing unit 142 to cause the synchronization processing unit 142 to search for another synchronization signal when the timer T42 expires. The synchronization control unit 144 then controls the synchronization processing unit 142 to cause the synchronization processing unit 142 to search for a synchronization signal of the attribute Attr1 having higher priority. As for the attributes Attr3 and Attr4, the synchronization control unit 144 similarly starts timers T43 to T44 after synchronization is established, and controls the synchronization processing unit 142 to cause the synchronization processing unit 142 to search for a synchronization signal of an attribute having higher priority when the timers expire.

As illustrated in FIG. 16, this maintaining period may be longer as the attribute of a synchronization signal has higher priority. If the synchronization control unit 144 fails in searching for another synchronization signal, the synchronization control unit 144 may start the timer again while maintaining synchronization.

In this way, the synchronization control unit 144 sets the length of the maintaining time from the establishment of synchronization to the start of a search for another synchronization signal, on the basis of the attribute of a synchronization signal synchronization of which has been established. Furthermore, similarly to the first embodiment, the synchronization control unit 144 may preferentially start to search for a synchronization signal of an attribute having higher priority after the maintaining period expires. This allows the terminal device 100 to switch synchronization to synchronization based on a synchronization signal of an attribute having higher priority even after the synchronization is once established.

8. APPLICATION EXAMPLES

The technology according to the present disclosure is applicable to a variety of products. For example, the base station 200 may be implemented as any type of evolved Node B (eNB) such as a macro eNB or a small eNB. Small eNBs may be, for example, pico eNBs, micro eNBs, or home (femto) eNBs that cover smaller cells than the macro cells. Instead, the base station 200 may be implemented as another type of base station such as eNodeBs and base transceiver stations (BTSs). The base station 200 may include the main device (which is also referred to as base station device) that controls radio communication and one or more remote radio heads (RRHs) that are arranged in different places from that of the main device. Various types of terminal device as discussed later may temporarily or semi-persistently execute the base station function, thereby operating as the base station 200.

The terminal device 100 may be implemented as a mobile terminal such as a smartphone, a tablet personal computer (PC), a notebook PCs, a portable game terminal, a portable/dongle mobile router, and a digital camera, or an in-vehicle terminal such as a car navigation device. The terminal device 100 may also be implemented as a terminal (which is also referred to as machine type communication (MTC) terminal) that performs machine to machine (M2M) communication. Furthermore, the terminal device 100 may be a radio communication module (e.g. integrated circuit module including a single die) that is mounted on these kinds of terminal.

[8-1. Application Examples for Terminal Device]

First Application Example

Figure 17:
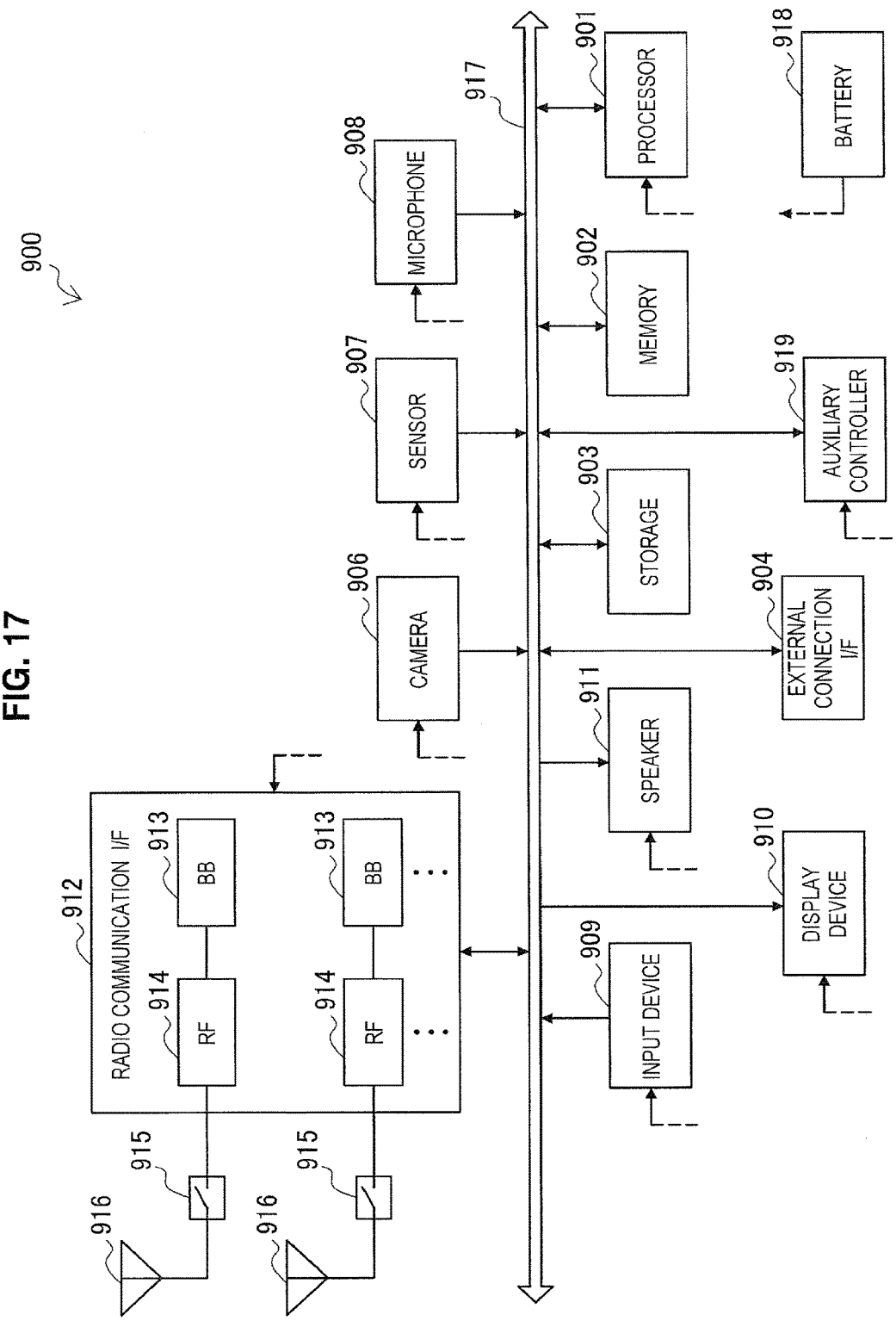
FIG. 17 is a block diagram illustrating an example of a schematic configuration of a smartphone.

FIG. 17 is a block diagram illustrating an example of the schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and another layer of the smartphone 900. The memory 902 includes an RAM and an ROM, and stores a program and data executed by the processor 901. The storage 903 may include a storage medium such as a semiconductor memory or a hard disk. The external connection interface 904 connects the smartphone 900 to an externally attached device such as a memory card or a universal serial bus (USB) device.

The camera 906 includes an image sensor such as a charge coupled device (CCD) or complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and receives an operation or an information input from a user. The display device 910 includes a screen such as a liquid crystal display (LCD) or an organic light emitting diode (OLED) display, and displays an output image of the smartphone 900. The speaker 911 converts the audio signal that is output from the smartphone 900 to a sound.

The radio communication interface 912 supports a cellular communication system such as LTE or LTE-Advanced, and performs radio communication. The radio communication interface 912 may typically include a BB processor 913 and an RF circuit 914. The BB processor 913 may, for example, perform encoding/decoding, modulation/demodulation, multiplexing/demultiplexing, and the like, and executes a variety of signal processing for radio communication. Meanwhile, the RF circuit 914 may include a mixer, a filter, and an amplifier, and transmits and receives a radio signal via the antenna 916. The radio communication interface 912 may be a one-chip module having the BB processor 913 and the RF circuit 914 integrated thereon. The radio communication interface 912 may include a plurality of BB processors 913 and a plurality of RF circuits 914 as illustrated in FIG. 17. FIG. 17 illustrates an example in which the radio communication interface 912 includes the plurality of BB processors 913 and the plurality of RF circuits 914, but the radio communication interface 912 may also include the single BB processor 913 or the single RF circuit 914.

Furthermore, the radio communication interface 912 may support another type of radio communication scheme such as short-distance radio communication schemes, near field communication schemes or wireless local area network (LAN) scheme in addition to cellular communication systems, and in that case, the radio communication interface 912 may include a BB processor 913 and an RF circuit 914 for each radio communication scheme.

Each of the antenna switches 915 switches a plurality of circuits (e.g. circuits for different radio communication schemes) included in the radio communication interface 912 to which the antennas 916 connect.

Each of the antennas 916 includes a single or a plurality of antenna elements (e.g. antenna elements included in an MIMO antenna), and is used for the radio communication interface 912 to transmit and receive a radio signal. The smartphone 900 may include the plurality of antennas 916 as illustrated in FIG. 17. FIG. 17 illustrates an example in which the smartphone 900 includes the plurality of antennas 916, but the smartphone 900 may also include the single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies electric power to each block of the smartphone 900 illustrated in FIG. 17 via a feeder line that is partially illustrated in the figure as a dashed line. The auxiliary controller 919, for example, operates a minimally necessary function of the smartphone 900 in a sleep mode.

The radio communication unit 110, the storage unit 120, the oscillation unit 130, and the control unit 140 described with reference to FIG. 7 may be implemented in the radio communication interface 912 of the smartphone 900 illustrated in FIG. 17. At least a part of these functions may be implemented by the processor 901 or the auxiliary controller 919.

Second Application Example

Figure 18:
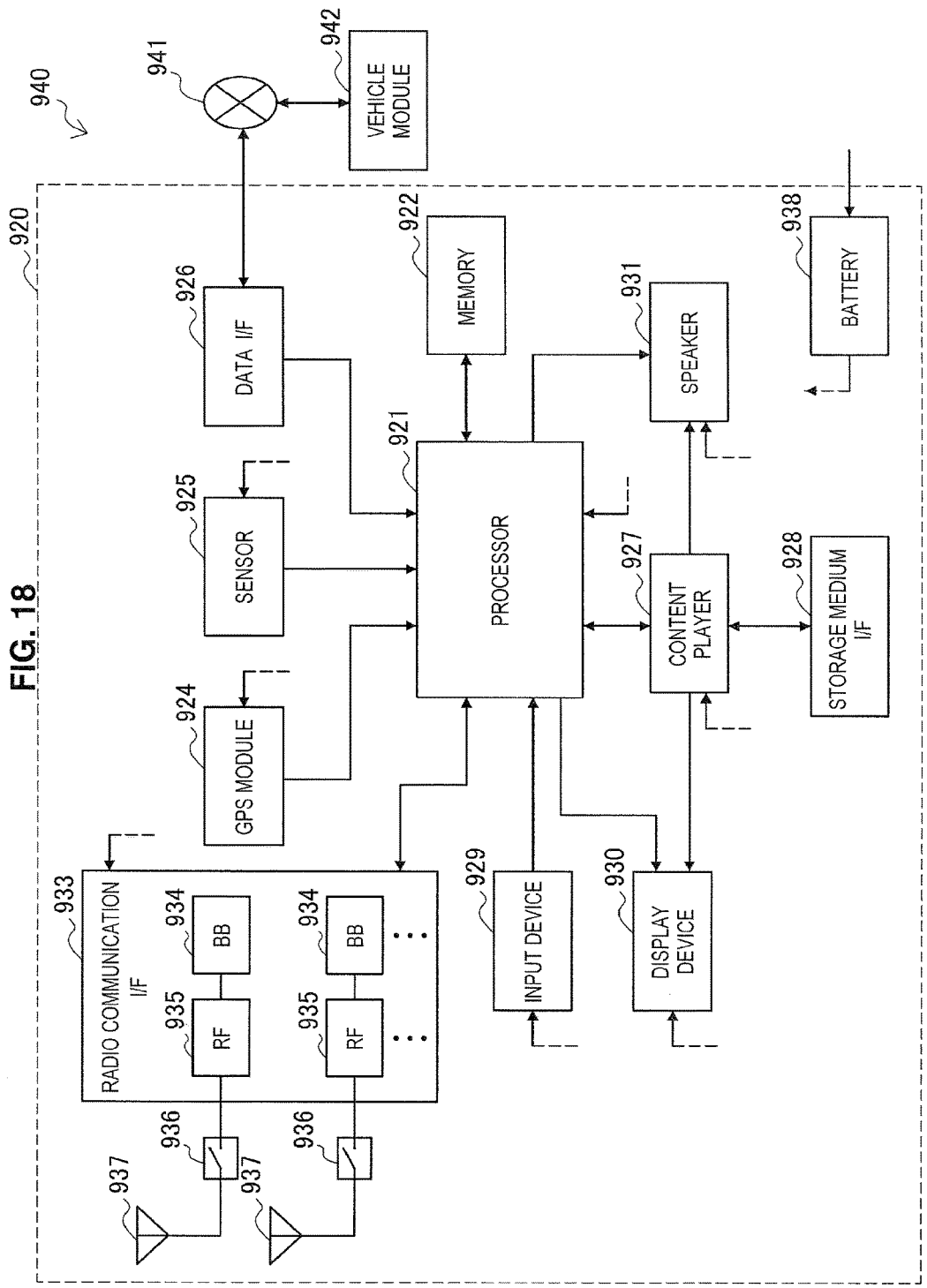
FIG. 18 is a block diagram illustrating an example of a schematic configuration of a car navigation device.

FIG. 18 is a block diagram illustrating an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or an SoC, and controls the navigation function and the other functions of the car navigation device 920. The memory 922 includes an RAM and an ROM, and stores a program executed by the processor 921 and data.

The GPS module 924 uses a GPS signal received from a GPS satellite to measure the position (e.g. latitude, longitude, and altitude) of the car navigation device 920. The sensor 925 may include a sensor group including, for example, a gyro sensor, a geomagnetic sensor, and a barometric sensor. The data interface 926 is, for example, connected to an in-vehicle network 941 via a terminal that is not shown, and acquires data such as car speed data generated on the vehicle.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and receives an operation or an information input from a user. The display device 930 includes a screen such as an LCD or an OLED display, and displays an image of the navigation function or the reproduced content. The speaker 931 outputs a sound of the navigation function or the reproduced content.

The radio communication interface 933 supports a cellular communication system such as LTE or LTE-Advanced, and performs radio communication. The radio communication interface 933 may typically include a BB processor 934 and an RF circuit 935. The BB processor 934 may, for example, perform encoding/decoding, modulation/demodulation, multiplexing/demultiplexing, and the like, and executes a variety of signal processing for radio communication. Meanwhile, the RF circuit 935 may include a mixer, a filter, and an amplifier, and transmits and receives a radio signal via the antenna 937. The radio communication interface 933 may be a one-chip module having the BB processor 934 and the RF circuit 935 integrated thereon. The radio communication interface 933 may include a plurality of BB processors 934 and a plurality of RF circuits 935 as illustrated in FIG. 18. FIG. 18 illustrates an example in which the radio communication interface 933 includes the plurality of BB processors 934 and the plurality of RF circuits 935, but the radio communication interface 933 may also include the single BB processor 934 or the single RF circuit 935.

Furthermore, the radio communication interface 933 may support another type of radio communication scheme such as short-distance radio communication schemes, near field communication schemes, and wireless LAN schemes in addition to cellular communication systems, and in that case, the radio communication interface 912 may include the BB processor 934 and the RF circuit 935 for each radio communication scheme.

Each of the antenna switches 936 switches a plurality of circuits (e.g. circuits for different radio communication schemes) included in the radio communication interface 933 to which the antennas 937 connect.

Each of the antennas 937 includes a single or a plurality of antenna elements (e.g. antenna elements included in an MIMO antenna), and is used for the radio communication interface 933 to transmit and receive a radio signal. The car navigation device 920 may include the plurality of antennas 937 as illustrated in FIG. 18. FIG. 18 illustrates an example in which the car navigation device 920 includes the plurality of antennas 937, but the car navigation device 920 may also include the single antenna 937.

Furthermore, the car navigation device 920 may include the antenna 937 for each radio communication scheme. In that case, the antenna switches 936 may be omitted from the configuration of the car navigation device 920.

The battery 938 supplies electric power to each block of the car navigation device 920 illustrated in FIG. 18 via a feeder line that is partially illustrated in the figure as a dashed line. The battery 938 accumulates the electric power supplied from the vehicle.

The radio communication unit 110, the storage unit 120, the oscillation unit 130, and the control unit 140 described with reference to FIG. 7 may be implemented in the radio communication interface 933 of the car navigation device 920 illustrated in FIG. 18. At least a part of these functions may be implemented by the processor 921.

The technology according to the present disclosure may be implemented as an in-vehicle system (or vehicle) 940 including one or more blocks of the car navigation device 920, the in-vehicle network 941, and a vehicle module 942. The vehicle module 942 generates vehicle data such as car speed, engine speed, and trouble information, and outputs the generated data to the in-vehicle network 941.

9. CONCLUSION

Each embodiment of the present disclosure has been described so far in detail with reference to FIGS. 1 to 18. As described above, a terminal device performs synchronization processing on the basis of a synchronization signal for radio communication, controls the monitoring period of the synchronization state of the synchronization signal that is subjected to the synchronization processing, in accordance with the transmission path of the synchronization signal, and control processing that is different in accordance with a monitoring result of the synchronization state for the monitoring period. This allows the terminal device to perform synchronization control that is different in accordance with a synchronization signal. The terminal device can effectively perform D2D communication in a LTE network. Accordingly, it is possible to offload data, resulting in the improved throughput of the entire communication system.

More specifically, a terminal device according to the first embodiment can acquire synchronization on the basis of a synchronization signal of an attribute having higher priority, by preferentially searching for a synchronization signal of an attribute having higher priority. If out-of-sync occurs after synchronization is established, a terminal device according to the second embodiment can maintain synchronization based on high priority, and suspend synchronization based on low priority early by setting the extension period to the start of a re-search in accordance with the priority of the attribute of the synchronized synchronization signal. A terminal device according to the third embodiment can enhance the safety of the processing after synchronization establishment by setting the length of the determination period to the determination of synchronization establishment in accordance with the priority of the attribute of the synchronization signal that has acquired synchronization. Even after synchronization is once established, a terminal device according to the fourth embodiment can switch synchronization to synchronization based on a synchronization signal of an attribute having higher priority by setting the length of the maintaining time after synchronization is established, in accordance with the attribute of the synchronization signal that has established the synchronization.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above embodiments each describe that the attribute Attr1 has the highest priority, followed by Attr2, Attr3, and Attr4 in this order. The present technology is not, however, limited to the example. For example, the attributes Attr1 to Attr4 may be rearranged in any order. In addition, for example, different attributes may be provided in accordance with the number of relays, and an attribute may have lower priority with increase in the number of relays.

The sequential processing by each device described herein may be realized by any one of software, hardware, and a combination of software and hardware. Programs included in the software are stored in advance, for example, in recording media (non-transitory media) provided inside or outside of the respective devices. Each program is read out, for example, by an RAM when each program is executed by a computer, and executed by a processor such as a CPU.

The processing described herein with reference to the flowcharts and the sequence diagrams does not necessarily have to be executed in the illustrated order. Some processing steps may be executed in parallel. Additional processing steps may also be adopted, while some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A terminal device including:

a synchronization processing unit configured to perform synchronization processing on the basis of a synchronization signal for radio communication; and a control unit configured to control a monitoring period of a synchronization state of the synchronization signal in accordance with a transmission path of the synchronization signal that is subjected to the synchronization processing, and to control processing that is different in accordance with a monitoring result of a synchronization state for the monitoring period.

(2)

The terminal device according to (1), wherein the control unit sets a length of the monitoring period for searching for the synchronization signal on the basis of the transmission path of the synchronization signal that is searched for.

(3)

The terminal device according to (2), wherein the control unit sets a greater length of the monitoring period for a search as the transmission path of the synchronization signal that is searched for has higher priority.

(4)

The terminal device according to any one of (1) to (3), wherein the control unit sets start timing of the monitoring period for searching for the synchronization signal on the basis of the transmission path of the synchronization signal that is searched for.

(5)

The terminal device according to (4), wherein the control unit sets earlier timing of the monitoring period for a search as the transmission path of the synchronization signal that is searched for has higher priority.

(6)

The terminal device according to any one of (1) to (5), wherein the control unit searches for the synchronization signal in a unit of a transmission path in series.

(7)

The terminal device according to any one of (1) to (5), wherein the control unit searches for the synchronization signal in a unit of a transmission path in parallel.

(8)

The terminal device according to any one of (1) to (7), wherein the control unit sets a length of the monitoring period from occurrence of out-of-sync to a start of a search for another synchronization signal on the basis of the transmission path of the synchronization signal out of sync.

(9)

The terminal device according to (8), wherein the control unit sets a greater length of the monitoring period to a start of a search for another synchronization signal as the transmission path of the synchronization signal out of sync has higher priority.

(10)

The terminal device according to any one of (1) to (9), wherein the control unit sets a length of the monitoring period for determining establishment of synchronization, and determines that synchronization is established when synchronization continuously results in success for the monitoring period.

(11)

The terminal device according to (10), wherein the control unit sets the length of the monitoring period for determining establishment of synchronization, on the basis of the transmission path of the synchronization signal that has succeeded in synchronization.

(12)

The terminal device according to (11), wherein the control unit sets a shorter length of the monitoring period for determining establishment of synchronization as the transmission path of the synchronization signal that has succeeded in acquiring synchronization has higher priority.

(13)

The terminal device according to any one of (1) to (12), wherein the control unit sets a length of the monitoring period from establishment of synchronization to a start of a search for another synchronization signal on the basis of the transmission path of the synchronization signal that has established synchronization.

(14)

The terminal device according to any one of (1) to (13), wherein the synchronization signal is a sequence that is different in accordance with the transmission path.

(15)

The terminal device according to (14), wherein the synchronization signal is a sequence that is different in accordance with whether the synchronization signal originates from a base station or a terminal device.

(16)

The terminal device according to (14) or (15), wherein
the synchronization signal is a sequence that is different in accordance with whether the synchronization signal is sent by a device from which the synchronization signal originates, or the synchronization signal is relayed by a terminal device different from the device from which the synchronization signal originates.

(17)

The terminal device according to any one of (1) to (16), wherein
the control unit sets the monitoring period by using setting information that is provided from a base station as system information or transmitted through radio resource control (RRC) signaling.

(18)

The terminal device according to any one of (1) to (17), further including:
an oscillation unit configured to oscillate a synchronization signal, wherein
the control unit controls the oscillation unit to cause the oscillation unit to oscillate a synchronization signal originating from the terminal device itself.

(19)

The terminal device according to any one of (1) to (18), further including:
an oscillation unit configured to oscillate a synchronization signal, wherein
the control unit controls the oscillation unit to cause the oscillation unit to oscillate a synchronization signal based on the transmission path of the synchronization signal synchronization of which has been established.

(20)

A method including:
performing synchronization processing on the basis of a synchronization signal for radio communication; and
controlling, by a processor, a monitoring period of a synchronization state of the synchronization signal in accordance with a transmission path of the synchronization signal that is subjected to the synchronization processing, and controlling processing that is different in accordance with a monitoring result of a synchronization state for the monitoring period.

REFERENCE SIGNS LIST 1 communication system
100 terminal device
110 radio communication unit
120 storage unit
130 oscillation unit
140 control unit
142 synchronization processing unit
144 synchronization control unit
146 signal processing unit
200 base station
21 cell

The invention claimed is:

1. A terminal device comprising:
circuitry configured to:
perform synchronization processing with another terminal device via wireless communication, based on one of a plurality of synchronization signals, each of the plurality of synchronization signals having a different transmission path attribute and priority;
manage a monitoring period for each of the plurality of synchronization signals in accordance with the priority corresponding to the respective synchronization signal; and
monitor a synchronization state of the one of the plurality of synchronization signals within the monitoring period corresponding to the respective synchronization signal, in order to conduct at least one of searching the one of the plurality of synchronization signals, determining establishment of the synchronization by the one of the plurality of synchronization signals, maintaining the synchronization by the one of the plurality of synchronization signals, and re-searching another synchronization signal among the plurality of synchronization signals in case of occurrence of an out-of-sync condition after establishment of the synchronization.

2. The terminal device according to claim 1, wherein
the circuitry is configured to set a greater length of the monitoring period for a synchronization signal having a higher priority among the plurality of synchronization signals, in case of the searching the one of the plurality of synchronization signals.

3. The terminal device according to claim 1, wherein
the circuitry is configured to set start timing of the monitoring period for the one of the plurality of synchronization signals in accordance with the priority corresponding to the one of the plurality of synchronization signals, in case of the searching the one of the plurality of synchronization signals.

4. The terminal device according to claim 3, wherein
the circuitry is configured to set an earlier timing of the monitoring period for a synchronization signal having a higher priority among the plurality of synchronization signals, in case of the searching the one of the plurality of synchronization signals.

5. The terminal device according to claim 1, wherein
the circuitry is configured to conduct the searching the one of the plurality of synchronization signals in serial order of the priorities of the plurality of synchronization signals, in case of the searching the one of the plurality of synchronization signals.

6. The terminal device according to claim 1, wherein
the circuitry is configured to conduct the searching the one of the plurality of synchronization signals in parallel among the plurality of synchronization signals, in case of the searching the one of the plurality of synchronization signals.

7. The terminal device according to claim 1, wherein
the circuitry is configured to set a greater length of the monitoring period for monitoring the synchronization state of the one of the plurality of synchronization signals having a higher priority among the plurality of synchronization signals, before starting the re-searching the other synchronization signal, in case of the re-searching the other synchronization signal among the plurality of synchronization signals in case of the occurrence of the out-of-sync condition after establishment of the synchronization.

8. The terminal device according to claim 1, wherein
the circuitry is configured to determine that the synchronization is established when the circuitry continuously detects the synchronization for the monitoring period, in case of the determining establishment of the synchronization by the one of the plurality of synchronization signals.

9. The terminal device according to claim 8, wherein
the circuitry is configured to set a shorter length of the monitoring period for the one of the plurality of synchronization signals having a higher priority, in case of the determining establishment of the synchronization by the one of the plurality of synchronization signals.

10. The terminal device according to claim 1, wherein
the circuitry is configured to set a shorter length of the monitoring period for monitoring the synchronization state of the one of the plurality of synchronization signals having a lower priority in order to start the re-searching the other synchronization signal having a higher priority than that of the one of the plurality of synchronization signals, in case of the maintaining the synchronization by the one of the plurality of synchronization signals.

11. The terminal device according to claim 1, wherein
each of the plurality of synchronization signals corresponds to different types of transmission paths.

12. The terminal device according to claim 11, wherein
the different types of transmission paths include a first type of transmission path in which the synchronization signal originates from a base station and a second type of transmission path in which the synchronization signal originates from the terminal device.

13. The terminal device according to claim 11, wherein
the different types of transmission paths further include a third type of transmission path in which the synchronization signal is sent by an original device from which the synchronization signal originates and a fourth type of transmission path in which the synchronization signal is relayed by a terminal device different from the original device from which the synchronization signal originates.

14. The terminal device according to claim 1, wherein
the circuitry is configured to set the monitoring period by using setting information that is provided from a base station as system information or transmitted through radio resource control (RRC) signaling.

15. The terminal device according to claim 1, further comprising:
an oscillator configured to oscillate a first synchronization signal, wherein
the circuitry is configured to control the oscillator to oscillate the first synchronization signal originating from the terminal device itself, to transmit the first synchronization signal to the other terminal device via the wireless communication.

16. The terminal device according to claim 1, further comprising:
an oscillator configured to oscillate a second synchronization signal, wherein
the circuitry is configured to control the oscillator to oscillate the second synchronization signal via a transmission path to another terminal device based on the synchronization by the second synchronization signal which has been established.

17. A method comprising:
performing synchronization processing with another terminal device via wireless communication, based on one of a plurality of synchronization, each of the plurality of synchronization signals having a different transmission path attribute and priority;
managing a monitoring period for each of the plurality of synchronization signals in accordance with the priority corresponding to the respective synchronization signal; and
monitoring a synchronization state of the one of the plurality of synchronization signals within the monitoring period corresponding to the respective synchronization signal, in order to conduct at least one of searching the one of the plurality of synchronization signals, determining establishment of the synchronization by the one of the plurality of synchronization signals, maintaining the synchronization by the one of the plurality of synchronization signals, and re-searching another synchronization signal among the plurality of synchronization signals in case of occurrence of an out-of-sync condition after establishment of the synchronization.

18. The terminal device according to claim 1, wherein
the circuitry is configured to set the priority of each of the plurality of synchronization signals based on accuracy and deterioration of a center frequency of the respective synchronization signal.

19. The terminal device according to claim 1, wherein
the priorities of the plurality of synchronization signals are set to, in descending order, a synchronization signal that originates from a base station and is sent from the base station, a synchronization signal that originates from the base station and is relayed by the terminal device, a synchronization signal that originates from the terminal device and is sent from the terminal device, and a synchronization signal that originates from the terminal device and is relayed by the terminal device.

20. The terminal device according to claim 1, wherein
the circuitry is configured to determine that the out-of-sync condition after establishment of the synchronization has occurred by using a detection error of a physical control format indicator channel (PCFICH) in a physical downlink control channel (PDCCH) during the establishment of synchronization.

* * * * *